(12) United States Patent
Takano et al.

(10) Patent No.: US 8,638,503 B2
(45) Date of Patent: Jan. 28, 2014

(54) ZOOM LENS AND INFORMATION DEVICE INCORPORATING THE SAME

(75) Inventors: Yohei Takano, Yokohama (JP); Hiromichi Atsuumi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/564,287

(22) Filed: Aug. 1, 2012

(65) Prior Publication Data
US 2013/0033759 A1    Feb. 7, 2013

(30) Foreign Application Priority Data

Aug. 5, 2011  (JP) .................................. 2011-172375
Aug. 5, 2011  (JP) .................................. 2011-172376

(51) Int. Cl.
*G02B 15/14* (2006.01)

(52) U.S. Cl.
USPC .......................................... 359/684; 359/676

(58) Field of Classification Search
CPC ......... G02B 15/00; G02B 15/14; G02B 15/16
USPC .......................................... 359/676, 683, 684
See application file for complete search history.

(56) References Cited

U.S. PATENT DOCUMENTS

| | | | | |
|---|---|---|---|---|
| 5,325,233 | A | * | 6/1994 | Nakatsuji et al. ............. 359/684 |
| 5,760,968 | A | * | 6/1998 | Ohtake et al. ................. 359/684 |
| 6,147,810 | A | | 11/2000 | Misaka |
| 6,236,516 | B1 | | 5/2001 | Misaka |
| 2009/0073572 | A1 | | 3/2009 | Atsuumi |
| 2009/0122418 | A1 | | 5/2009 | Atsuumi et al. |
| 2009/0135500 | A1 | | 5/2009 | Sudoh et al. |
| 2009/0147375 | A1 | | 6/2009 | Sudoh et al. |
| 2010/0091173 | A1 | | 4/2010 | Miyazaki et al. |
| 2010/0195207 | A1 | | 8/2010 | Uchida et al. |
| 2010/0238565 | A1 | | 9/2010 | Takano et al. |

(Continued)

FOREIGN PATENT DOCUMENTS

| | | |
|---|---|---|
| JP | 10-48518 A | 2/1998 |
| JP | 2819727 | 8/1998 |

(Continued)

OTHER PUBLICATIONS

Extended European Search Report issued Feb. 21, 2013 in Patent Application No. 12178711.3.
U.S. Appl. No. 13/419,747, filed Mar. 14, 2012, Hiromichi Atsuumi, et al.
U.S. Appl. No. 13/482,401, filed May 29, 2012, Takano, et al.

*Primary Examiner* — Darryl J Collins
(74) *Attorney, Agent, or Firm* — Oblon, Spivak, McClelland, Maier & Neustadt, L.L.P.

(57) ABSTRACT

A zoom lens includes first to fifth lens groups having positive, negative, negative, positive, and positive refractive power, respectively. The third lens group includes a single negative meniscus lens with a concave surface on an object side, to move along the optical axis for focusing. When zooming from a wide angle end to a telephoto end, an interval between the first and second lens groups increases, an interval between the second and third lens groups increases, an interval between the third and fourth lens groups decreases, and an interval between the fourth and fifth lens groups decreases. The fourth and fifth lens groups are set to have a combined lateral magnification $\beta_{45T}$ to satisfy the following condition, when an object distance is infinite at a telephoto end:

$$-0.041 < \beta_{45T}/Ft < -0.025$$

where Ft is a focal length of the entire zoom lens at the telephoto end.

16 Claims, 18 Drawing Sheets

(56) References Cited

U.S. PATENT DOCUMENTS

| | | |
|---|---|---|
| 2011/0002047 A1 | 1/2011 | Takano et al. |
| 2011/0002048 A1 | 1/2011 | Takano et al. |
| 2011/0109978 A1 | 5/2011 | Yamada et al. |
| 2012/0008216 A1 | 1/2012 | Takano et al. |

FOREIGN PATENT DOCUMENTS

| | | |
|---|---|---|
| JP | 3397686 | 2/2003 |
| JP | 3716418 | 9/2005 |
| JP | 4401451 | 11/2009 |
| JP | 2010-175954 | 8/2010 |

* cited by examiner

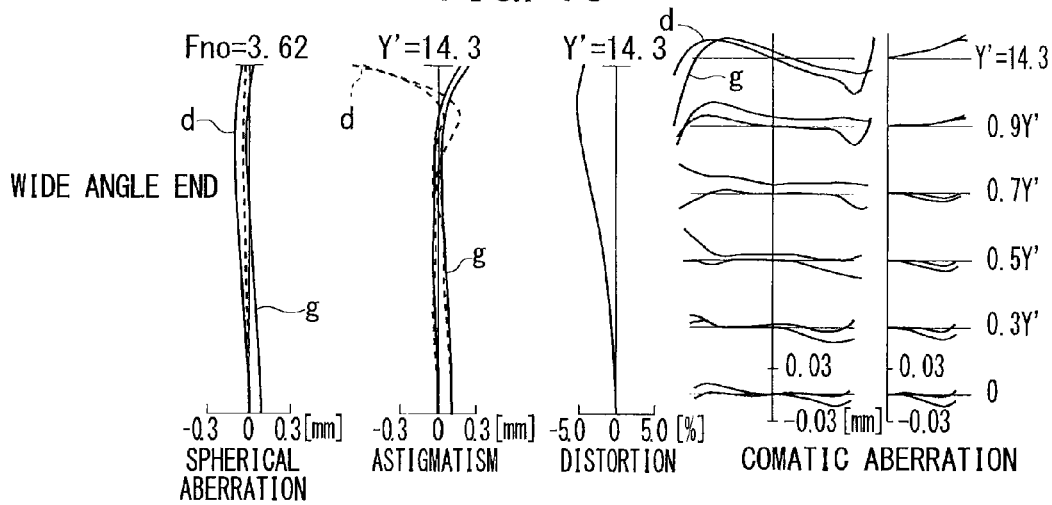
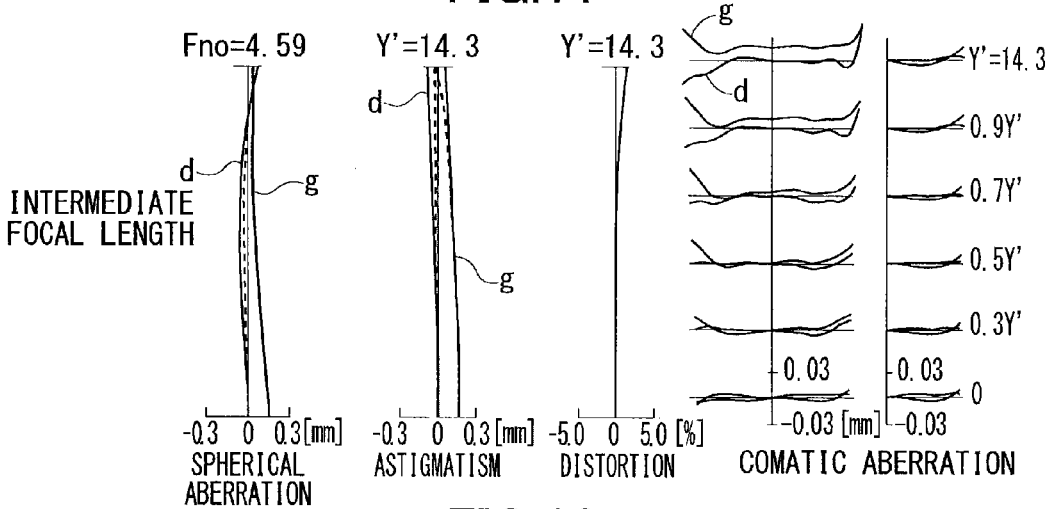
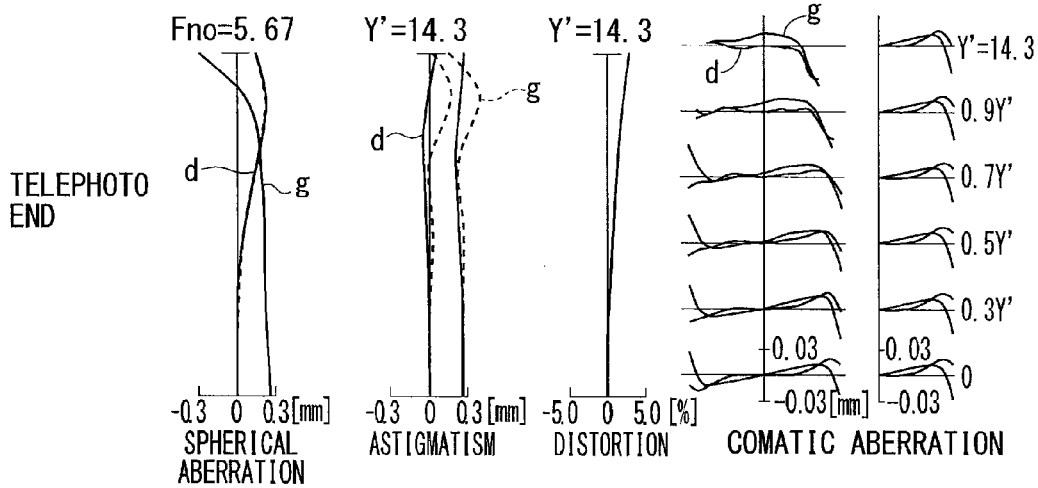

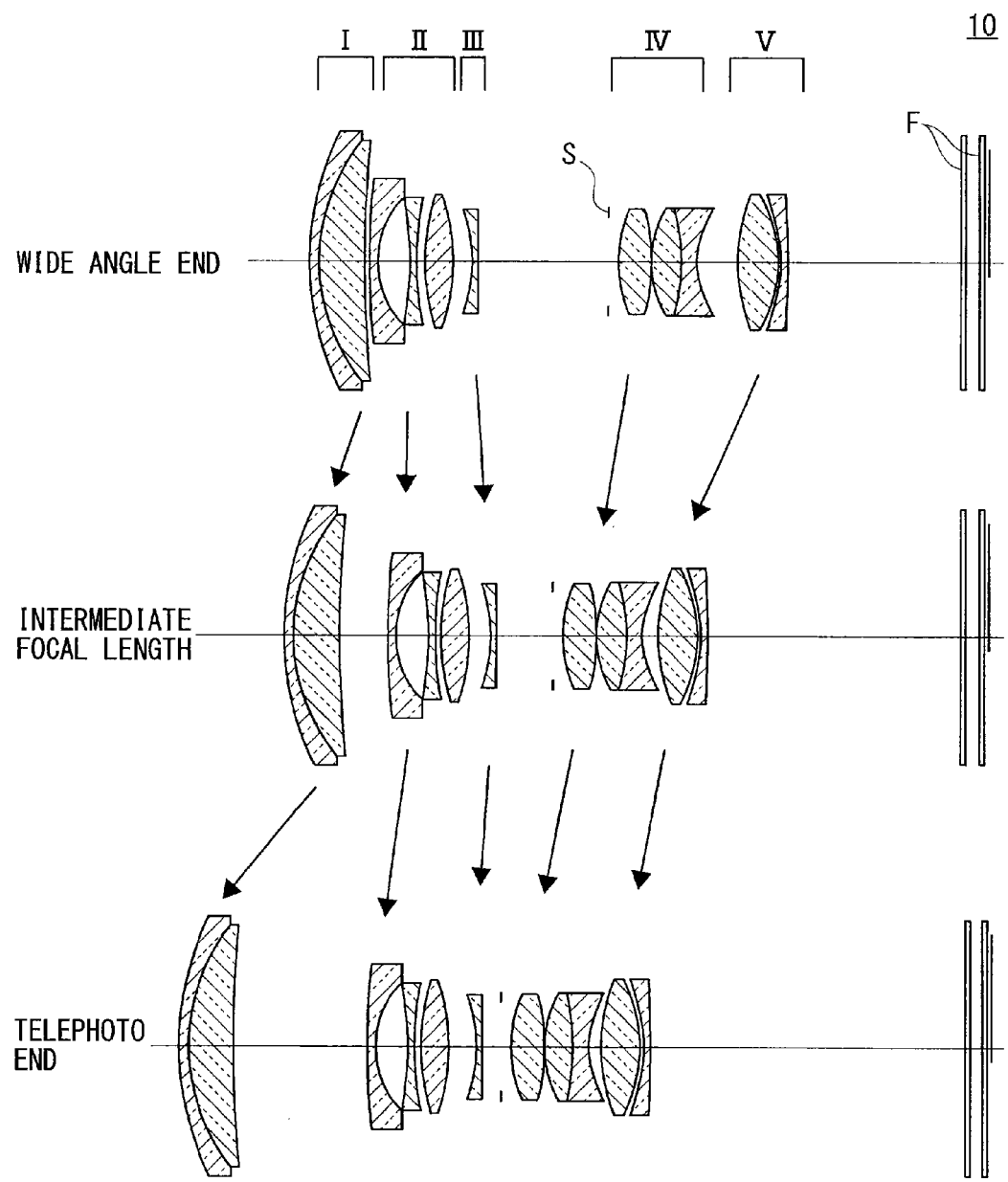

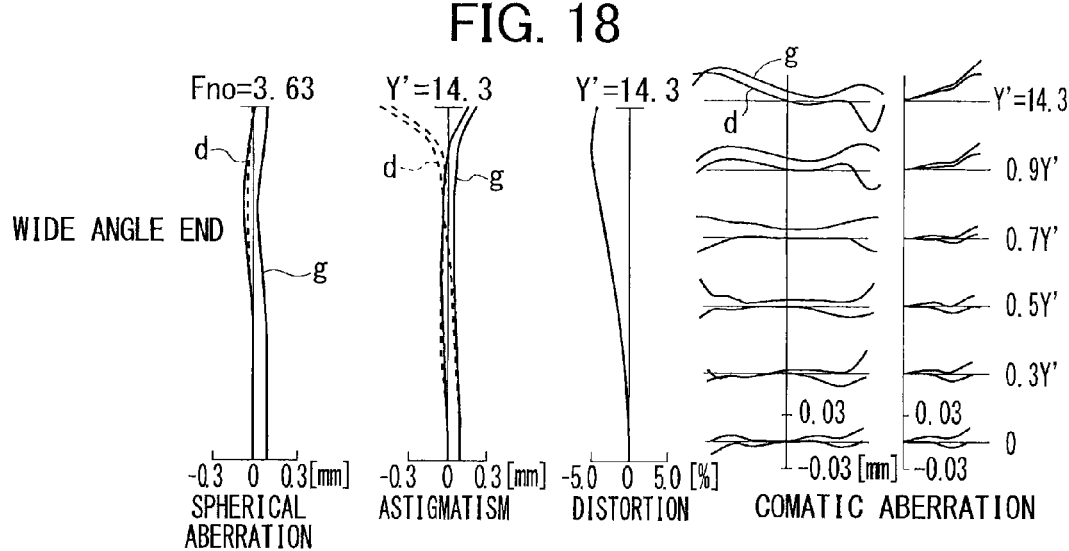
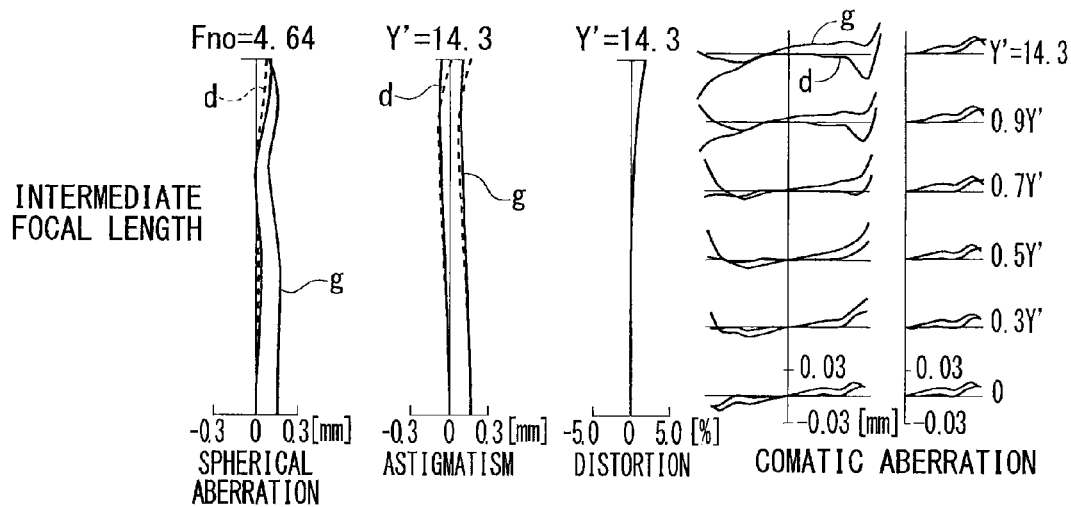
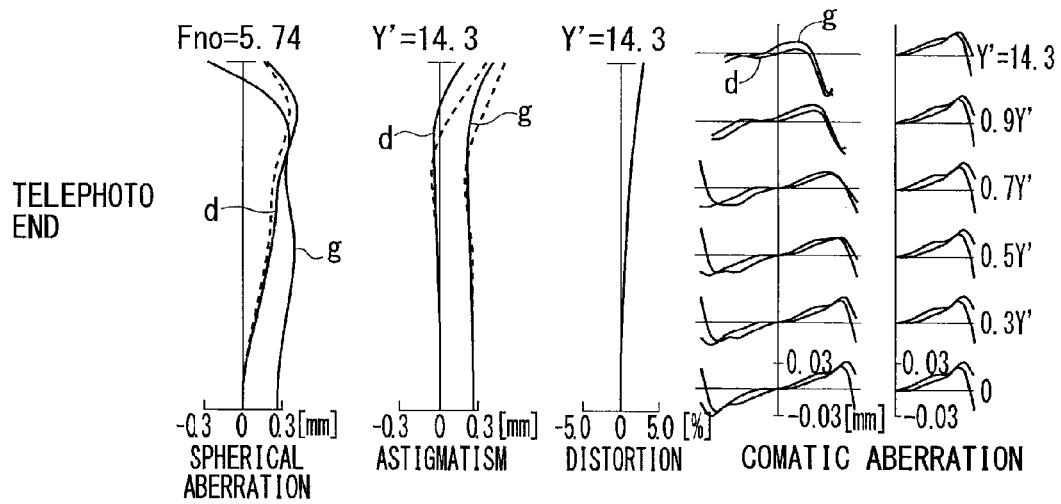

ZOOM LENS AND INFORMATION DEVICE INCORPORATING THE SAME

CROSS REFERENCE TO RELATED APPLICATION

The present application is based on and claims priority from Japanese Patent Application No. 2011-172375 and No. 2011-172376, both filed on Aug. 5, 2011, the disclosure of which is hereby incorporated by reference in its entirety.

BACKGROUND OF THE INVENTION

1. Field of the Invention

The present invention relates to a zoom lens applicable as an optical system to an imaging device such as digital still camera, digital video camera, silver halide camera as well as to an information device such as data terminal device incorporating such a zoom lens.

2. Description of the Related Art

In recent years a digital camera including a zoom lens as an optical system has been popular. Especially, a zoom lens with a focal length range including 50 mm in 35 mm equivalent is well known. There have been users' strong demands for development of a compact-size, wider angle, high-speed autofocus (AF) zoom lens.

Japanese Patent Application Publication No. 3-228008 (Reference 1), Japanese Patent No. 3716418 (Reference 2), No. 3397686 (Reference 3), No. 4401451 (Reference 4), and Japanese Patent Application Publication No. 2010-175954 (Reference 5) disclose positive lead type zoom lenses including a first lens group having a positive refractive power and a second lens group having a negative refractive power and the following lens groups, for example. This type can easily enlarge zoom ratio and can be very compact in the total length so that various products are available.

The zoom lenses disclosed in the above documents are of inner focus type. According to the one in Reference 1 a second lens group is moved to focus an object while according to the ones in Reference 2 to 5 a third lens group with a negative refractive power is moved to focus an object.

The zoom lens in Reference 1 has a drawback in that due to a large weight of the second lens group as a focus lens, a motor or actuator therefor needs to be large in size, increasing the maximal diameter of a lens barrel. Moreover, it is difficult to heighten AF operation speed and reduce noise during video shooting.

The focus lenses of the zoom lenses in References 2 to 4 are not light enough in weight. The third lens group of the zoom lens in Reference 5 as a focus lens is comprised of a single negative lens, therefore, light in weight. This can achieve high speed AF operation and the lens barrel thereof can be downsized. However, it needs to be improved in terms of zooming operation and downsizing.

SUMMARY OF THE INVENTION

The present invention aims to provide a compact, high performance zoom lens which achieves half angle of view of 36.8 degrees or more at wide angle end, high zoom ratio of about 2.8 to 5.0, resolution equivalent to an image sensor with 5 to 10 million pixels or more and a reduction in the moving amount of a focus lens. It also aims to provide a light, compact-size, high performance information device incorporating such a zoom lens.

According to one aspect of the present invention, a zoom lens comprises a first lens group having a positive refractive power, a second lens group having a negative refractive power, a third lens group having a negative refractive power and comprised of a single negative meniscus lens with a concave surface on an object side, to move along an optical axis for focusing, a fourth lens group having a positive refractive power, a fifth lens group having a positive refractive power, the first to fifth groups being arranged along the optical axis in order from an object side, and an aperture stop disposed between the third lens group and the fourth lens group, in which when zooming from a wide angle end to a telephoto end, the zoom lens is moved so that an interval between the first and second lens groups increases, an interval between the second and third lens groups increases, an interval between the third and fourth lens groups decreases, and an interval between the fourth and fifth lens groups decreases, and the fourth and fifth lens groups are set to have a combined lateral magnification to satisfy the following condition, when an object distance is infinite at a telephoto end:

$$-0.041 < \beta_{45T}/Ft < -0.025$$

where Ft is a focal length of the entire zoom lens at the telephoto end and $\beta_{45T}$ is combined lateral magnification of the fourth and fifth lens groups.

BRIEF DESCRIPTION OF THE DRAWINGS

Features, embodiments, and advantages of the present invention will become apparent from the following detailed description with reference to the accompanying drawings:

FIG. 10 shows the aberration curves of the zoom lens at wide angle end according to the third embodiment;

FIG. 11 shows the aberration curves of the zoom lens at intermediate focal length according to the third embodiment;

FIG. 12 shows the aberration curves of the zoom lens at telephoto end according to the third embodiment;

FIG. 13 shows the configuration of a zoom lens according to a fourth embodiment;

FIG. 18 shows the aberration curves of the zoom lens at wide angle end according to the fifth embodiment;

FIG. 19 shows the aberration curves of the zoom lens at intermediate focal length according to the fifth embodiment;

FIG. 20 shows the aberration curves of the zoom lens at telephoto end according to the fifth embodiment;

DETAILED DESCRIPTION OF THE PREFERRED EMBODIMENTS

Figure 1:
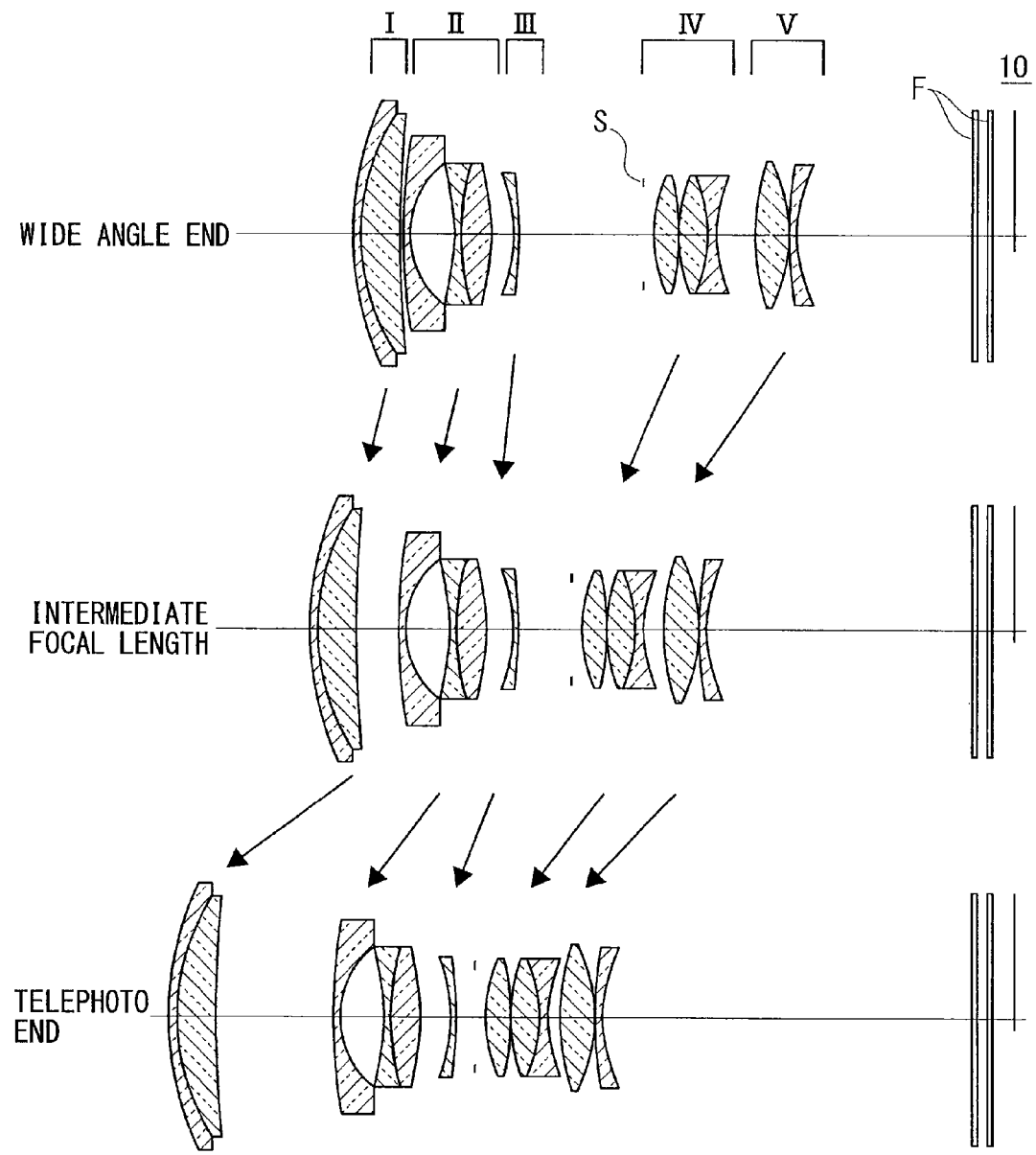
FIG. 1 shows the configuration of a zoom lens according to a first embodiment.

Hereinafter, embodiments of the present invention will be described in detail with reference to the accompanying drawings. Wherever possible, the same reference numbers will be used throughout the drawings to refer to the same or like parts.

Examples of a zoom lens are described with reference to FIGS. 1 to 32. FIGS. 1, 5, 9, 13, 17, 21, 25, and 29 show the arrangements of a zoom lens 10 according to later-described first to eighth embodiments, respectively. In the drawings the topmost views are lens arrangements at wide angle end, the middle views are the same at intermediate focal length and the bottommost views are the same at telephoto end. The arrows indicate the positional changes of the lens groups while zooming from the wide angle end to the telephoto end.

In the drawings the left side is an object side and the right side is an image plane side. The zoom lens 10 is comprised of a first lens group I having a positive refractive power, a second lens group II having a negative optical power, a third lens group III having a negative refractive power, an aperture stop S, a fourth lens group IV having a positive refractive power, a fifth lens group V having a positive refractive power, and a filter F. These elements are arranged on the optical axis in this order from an object side. The filter F is two transparent parallel plates as various filters such as an optical low pass filter, an infrared cutoff filter, or a cover glass for a light receiving element as a CCD sensor.

In zooming from wide angle end to telephoto end, the first to fifth lens groups I to V independently move toward the object side so that an interval between the first and second lens groups I, II increases, an interval between the second and third lens groups II, III increases, an interval between the third and fourth lens groups III, IV decreases, and an interval between the fourth and fifth lens groups IV, V decreases. The aperture stop S moves integrally with the fourth lens group IV.

The first lens group I is comprised of a negative meniscus lens having a convex surface on the object side and a positive meniscus lens having a convex surface face on the object side.

The second lens group II is made up of a negative meniscus lens with a convex surface on the object side, a biconcave lens and a biconvex lens in this order.

The third lens group III is a single negative meniscus lens with a large concave surface on the object side, and moves along the optical axis for focusing.

The fourth lens group IV is made up of a biconvex lens and a cemented lens of a biconvex lens and a biconcave lens in this order.

The fifth lens group V is made up of a biconvex lens and a negative meniscus lens with a convex surface on the object side.

Figure 33A:
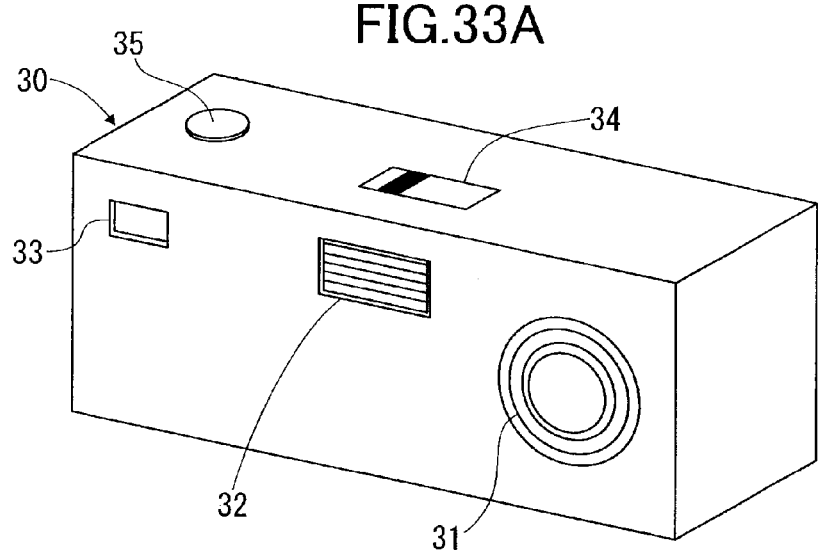
FIGS. 33A to 33C show the structure of a hand-held data terminal device according to one embodiment.
Figure 33B:
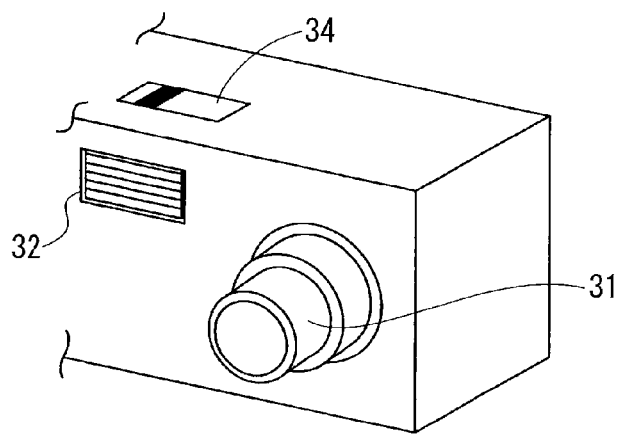
Figure 33C:
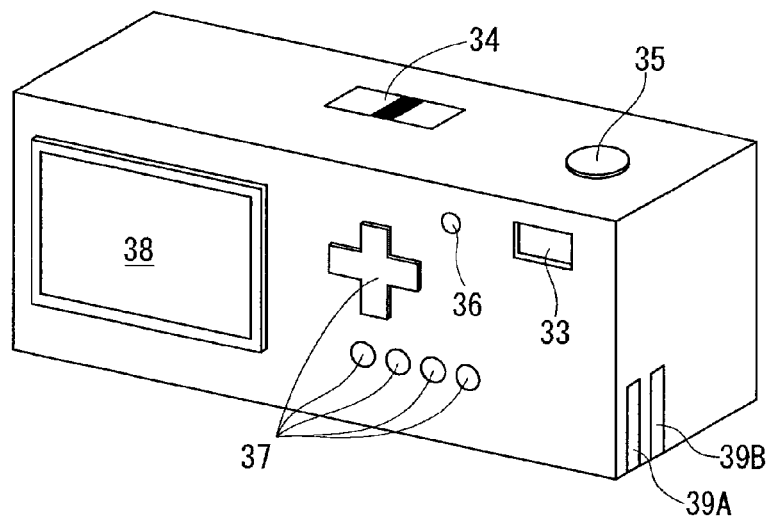
Figure 34:
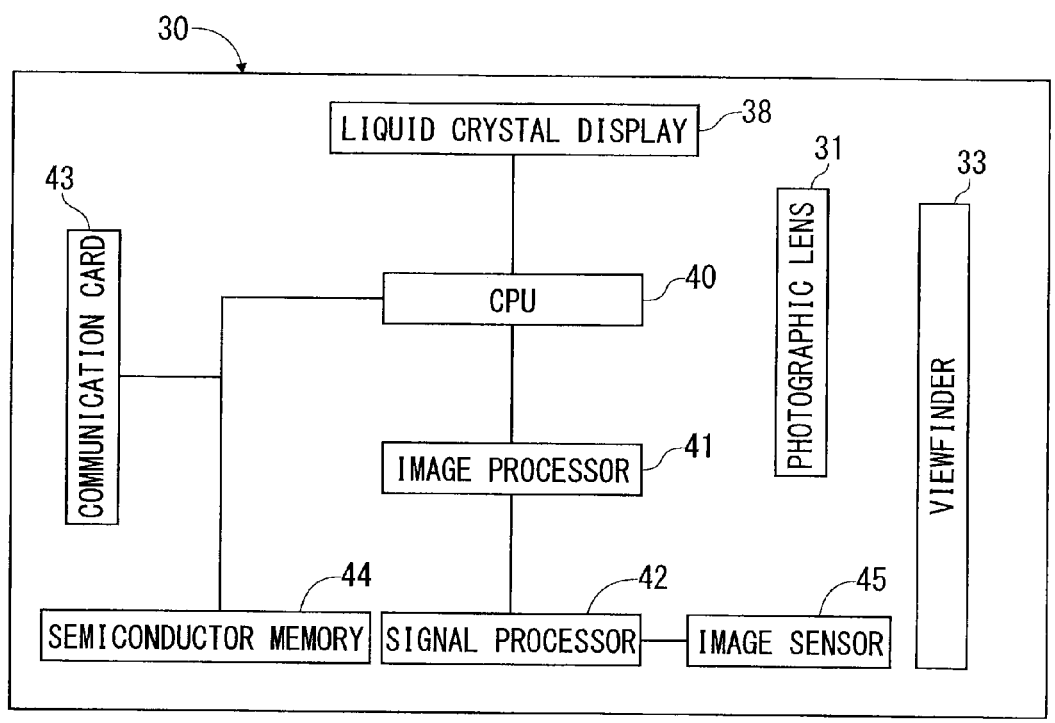
FIG. 34 shows the system structure of the device in FIG. 33.

Referring to FIGS. 33A, 33B, 33C, and 34, a hand-held data terminal device as an example of an information device is described. FIGS. 33A to 33C show the exterior of a camera device or a camera unit of a hand-held data terminal device by way of example. FIG. 34 shows the system structure of the hand-held data terminal device. A hand-held data terminal device 30 in FIG. 34 includes a photographic lens 31, a solid image sensor 45 with 5 to 10 million pixels two-dimensionally arranged, to capture the image of a subject with the photographic lens 31 and read it with the image sensor 45.

The photographic lens 31 is the zoom lens 10 according to one embodiment of the present invention. The device 30 further includes a zoom adjuster 34 and a viewfinder 33 for zooming.

Under the control of a CPU 40, a signal processor 42 converts the output from the image sensor 45 to digital image data and an image processor 41 conducts predetermined image processing on the digital image data. The digital image data is stored in a semiconductor memory 44.

An LCD 38 displays processed images during shooting operation, zoomed images, and images stored in the semiconductor memory 44. The images can be transmitted to outside from the semiconductor memory 44 via a communication card 43.

The image processor 41 electrically corrects shading in images and trims the center portion of an image.

In FIG. 33A the photographic lens 31 is collapsed in a device body. Upon a user's turning-on of a power switch 36, the lens barrel is protruded as shown in FIG. 33B.

In FIG. 33B the five lens groups of the zoom lens are arranged in the lens barrel at an infinite object distance. Upon a half-press to a shutter button 35, the lens groups becomes ready to focus in a limited object distance. As described above, the third lens group III is moved to focus.

An operation button 37 in FIG. 33C is used to display images on the LCD 38 from the memory 44 or transmit the images to outside via the communication card 43. The communication card 43 and memory 44 are inserted into dedicated or general-purpose slots 39A, 39B for use.

In a collapsed state the five lens groups do not have to be aligned on the optical axis. For example, the first and second lens groups can be placed off-the-axis and in parallel to the other lens groups. This enables thinning of the hand-held data terminal device.

The hand-held data terminal device 30 including the zoom lens 10 as photographic lens 31 and the image sensor 45 with 5 to 10 million pixels can be compact in size and generate high-quality images.

The zoom lens 10 is configured to satisfy various conditions as follows. The fourth and fifth groups are set to have a combined lateral magnification $\beta_{45T}$ to satisfy the following condition, when an object distance is infinite at telephoto end:

$$-0.041 < \beta_{45T}/Ft < -0.025 \qquad 1.$$

where Ft is a focal length of the entire zoom lens.

Further, the fourth and fifth lens groups are set to have focal lengths F4, F5, respectively to satisfy the following conditions:

$$1.0 < F4/Fm < 1.5 \qquad 2.$$

$$1.1 < F5/Fm < 1.8 \qquad 3.$$

where Fw is a focal length at the wide angle end, Ft is a focal length at telephoto end, and Fm is a geometric mean of Ft obtained by $\sqrt{(Fw*Ft)}$.

The third lens group is set to exert a combined lateral magnification $\beta_{3T}$ to satisfy the following condition when an object distance is infinite at telephoto end:

$$0.1 < \beta_{3T} < 0.6 \qquad 4.$$

The negative meniscus lens of the third lens group is made from a material with an abbe number vd which satisfies the following condition:

$$vd > 50 \qquad 5.$$

The zoom lens 10 is set to satisfy the following conditions:

$$0.75 < Y'/Fw \qquad 6.$$

$$2.8 < Ft/Fw \qquad 7.$$

where Y' is a maximal image height, Ft is a focal length at the telephoto end, and F2 is a focal length at the wide angle end.

Furthermore, the fourth and fifth lens groups are set to exert a combined lateral magnification $\beta_{45T}$, $\beta_{45W}$ satisfying the following conditions, when an object distance is infinite at telephoto end or at wide angle end:

$$2.0 < \beta_{45T}/\beta_{45W} < 2.5 \qquad 8.$$

$$-1.1 < \beta_{45W} < -0.7 \qquad 9.$$

$$-2.4 < \beta_{45T} < -1.8 \qquad 10.$$

The third lens group is set to exert a lateral magnification $\beta_{3T}$, $\beta_{3w}$ satisfying the following condition when an object distance is infinite at telephoto end or at wide angle end:

$$0.7 < \beta_{3T}/\beta_{3w} < 0.98 \qquad 11.$$

The zoom lens 10 includes the third lens group with a negative refractive power as a focus lens. Because of this, the moving amount of the focus lens can be reduced, thereby heightening the AF operation speed with less noise.

Generally, in a positive lead type zoom lens a sum of the interval between the second and third lens groups and the interval between the third and fourth lens groups is smaller at telephoto end. Therefore, downsizing of the zoom lens is feasible by arranging the lens groups to reduce the sum of the intervals. The zoom lens 10 achieves a reduction in the sum of the intervals at telephoto end, and an area between the second and fourth lens groups is narrowed accordingly.

At telephoto end the third lens group needs to move in the narrowed area between the second and fourth lens groups for focusing so that the sum of the intervals at telephoto end has to be larger than the moving distance of the third lens group from infinite to close range. Accordingly, reducing the moving amount of the third lens group at telephoto end makes it possible to reduce the sum of the intervals, which realizes further reduction in the size of the zoom lens 10.

A relation among the lateral magnification $\beta_F$ of the focus lens, the combined lateral magnification $\beta_{45}$ of the fourth and fifth lens groups, and focus sensitivity FS (ratio of focal displacement to focus lens moving amount) is expressed by the following equation:

$$FS = (1-\beta_F^2)*(\beta_{45})^2$$

Thus, the larger the absolute value of the combined lateral magnification $\beta_{45}$, the larger the focus sensitivity FS so that a desired focus sensitivity can be realized with a reduction in the moving amount of the third lens group as a focus lens.

The first condition is to define the appropriate range of the combined lateral magnification of the fourth and fifth lens groups at telephoto end. If the combined lateral magnification is over the upper limit, the absolute value thereof will be too small and so will the focus sensitivity FS at telephoto end.

Because of this, the moving amount of the third lens group at telephoto end needs to be increased, which hinders the downsizing of the zoom lens at telephoto end and higher-speed AF operation.

Meanwhile, if the combined lateral magnification is below the lower limit, the absolute value thereof will be too large and so will the focus sensitivity FS at telephoto end. The moving amount of the third lens group can be reduced, which contributes to the downsizing of the zoom lens and higher-speed AF operation. However, problems such as a decrease in focus accuracy and an increase in sensitivity to manufacturing errors may arise due to the increase in the absolute value of the combined lateral magnification $\beta_{45}$.

The parameter $\beta_{45T}/Ft$ of the first condition is preferably set to satisfy the following condition:

$$-0.0405 < \beta_{45T}/Ft < -0.035$$

The second and third conditions are set to define a proper focal length range of the fourth and fifth lens groups, respectively. The focal lengths below the lower limits mean an increased positive power of the fourth and fifth lens groups, resulting in increasing sensitivity to eccentric errors and a load on the other lens groups, and causing an increase in aberrations. Meanwhile, the focal lengths over the upper limits mean a reduced positive power thereof with the sensitivity to eccentric errors reduced. However, it does not lead to downsizing the zoom lens. Thus, by satisfying the first to third conditions, an easily assembled, compact size zoom lens with low eccentric error sensitivity and less aberration can be realized.

The parameters F4/Fm, F5/Fm of the second and third conditions are preferably set to satisfy the following conditions:

$$1.0 < F4/Fm < 1.4$$

$$1.1 < F5/Fm < 1.6$$

The fourth condition is to define a proper lateral magnification of the third lens group. The larger the parameter $\beta_{3T}$, the smaller the factor of focus sensitivity $(1-\beta_F^2)$ and the smaller the focus sensitivity at telephoto end. With the parameter over the upper limit, the moving amount of the third lens group at telephoto end becomes extremely large, which hinders the downsizing of the zoom lens.

A smaller parameter $\beta_{3T}$ and a larger focus sensitivity FS lead to downsizing the zoom lens. However, with the parameter below the lower limit, a problem such as an increase in sensitivity to manufacturing errors or a decrease in focus accuracy is likely to occur.

Thus, by properly setting the combined lateral magnification of the fourth and fifth lens groups and the lateral magnification of the third lens group, it is possible to balance the performance of all the lens groups well, reduce the moving amount of the focus lens and aberrations.

The parameter $\beta_{3T}$ of the fourth condition is preferably set to satisfy the following condition:

$$0.15<\beta_{3T}<0.5$$

Using a negative lens made of low dispersion glass satisfying the fifth condition for the third lens group, various types of aberration can be effectively reduced and aberration correction can be easily feasible since a load on the other lens groups is abated.

The sixth condition is to define angle of view. A high-performance, compact size zoom lens with a half angle of view of 36.8 degrees or more at wide angle end can be realized. The seventh condition is to define zoom ratio. A high-performance, wide angle, zoom lens in compact size with zoom ratio of 2.8 or more can be realized.

The parameters of the sixth and seventh conditions are preferably set to satisfy the following conditions:

$$0.87<Y'/Fw$$

$$3.0<Ft/Fw<5.0$$

The diameter of the aperture stop S should be constant irrespective of zooming ratio in terms of mechanical simplicity. However, setting it to be larger at telephoto end than at wide angle end can reduce a change in F-number. Further, to reduce the amount of light reaching the image plane, the aperture stop can be decreased in diameter. However, insertion of ND filter or the like will be more preferable to a change in the aperture stop diameter, with a decrease in resolution due to diffraction taken into account.

The zoom lens 10 is comprised of the five lens groups. Alternatively, the number of lens groups following the third lens group as a focus lens can be increased to three or more. This can reduce a load on the first to third lens groups for focusing and increase the degree of freedom, so that an advantageous zoom lens in terms of aberration correction and workability is realized.

However, increasing the number of lens groups after the focus lens hinders the downsizing of the zoom lens. The zoom lens can be comprised of four lens groups in reduced size but it is disadvantageous in terms of design degree of freedom and aberration correction. In conclusion the zoom lens made of five lens groups is good for achieving high performance and compactness.

The eighth condition is to define a proper range of lateral magnification of the fourth and fifth groups. The parameters $\beta_{45T}/\beta_{45W}$ represent the degree of change in lateral magnification in zooming from wide angle end to telephoto end. The larger the parameter, the larger the zooming performance of the fourth and fifth groups and the smaller that of the second and third groups. Owing to the reduction in the moving amount of the second lens group, the zoom lens can be downsized.

However, with the parameter being over the upper limit of 2.5, the zooming performance of the fourth and fifth lens groups will be too large and that of the second and third lens groups will be too small, leading to increasing the eccentric sensitivity of the forth and fifth lens groups, unbalancing the performances of the five lens groups and making it difficult to correct aberration sufficiently.

With the parameter being below the lower limit of 2.0, the moving amount of the second lens group in zooming will be too large, which makes it difficult to downsize the zoom lens.

The parameters $\beta_{45W}$, $\beta_{45T}$ of the ninth and tenth conditions become smaller in absolute value toward the upper limit and larger toward the lower limit.

With the parameters over the upper limit, the focus sensitivity FS will be too small both at wide angle end and telephoto end, which hinders a reduction in the moving amount of the third lens group as a focus lens and a reduction in AF operation speed. In particular, downsizing the zoom lens at telephoto end cannot be achieved.

Oppositely, with the parameters below the lower limit, the focus sensitivity FS will be too large both at wide angle end and telephoto end. A larger focus sensitivity means a decrease in the moving amount of the focus lens, which results in heightening AF operation speed at wide angle end and downsizing the zoom lens and increasing the AF operation speed at telephoto end. However, it is likely to cause an increase in sensitivity to manufacturing errors and a decrease in focus accuracy.

Satisfying the eighth to tenth conditions, the moving amounts of the second and third lens groups can be well balanced. Therefore, a compact-size zoom lens with small sensitivity to manufacturing errors and good aberration correction can be corrected.

The parameters of the eighth to tenth conditions are preferably set to satisfy the following conditions, respectively:

$$2.07<\beta_{45T}/\beta_{45W}<2.35$$

$$-0.95<\beta_{45W}<-0.85$$

$$-2.2<\beta_{45T}<-1.85$$

The eleventh condition is to define a proper zooming performance of the third lens group. The parameters $\beta_{3T}/\beta_{3W}$ are a ratio of the lateral magnification thereof at telephoto end to that at wide angle end so that the larger the parameter, the larger the zooming performance of the third lens group.

With the parameters falling outside the range, the zooming performance of the third lens group will be too small or too large, which may cause increases in sensitivity to manufacturing errors, the size of the zoom lens, and various aberrations.

The parameters $\beta_{3T}/\beta_{3W}$ are preferably set to satisfy the following condition:

$$0.70<\beta_{3T}/\beta_{3W}<0.96$$

Hereinafter, the first to eighth embodiments of a zoom lens 10 is described. Numeral codes and symbols used hereinafter denote as follows:

f: total focal length of lens system
F: F-number
ω: half field of angle (degree)
Face No.: number of lens surfaces counted from object side
R: curvature radius of lens surface (paraxial curvature radius of aspheric surface)
D: interval between two lens surfaces on the axis
Nd: refractive index
vd: Abbe number
K: conic constant of aspheric surface
$A_4$: fourth order aspheric coefficient
$A_6$: sixth order aspheric coefficient
$A_8$: eighth order aspheric coefficient
$A_{10}$: tenth order aspheric coefficient
$A_{12}$: twelfth order aspheric coefficient The aspheric surface is expressed by the following known formula:

$$X=CH^2/\{1+\sqrt{(1-(1+K)C^2H^2)}\}+A_4 \cdot H^4 + A_6 \cdot H^6 + A_8 \cdot H^8 + A_{10} \cdot H^{10} + A_{12} \cdot H^{12} + A_{14} \cdot H^{14} \ldots$$

where X is an amount of asphericity along the optical axis, C is a paraxial curvature (inverse of paraxial curvature radius), H is height from the optical axis, and K is a conic constant.

First Embodiment

The following table 1 shows specific data on the zoom lens 10 in FIG. 1 with f=16.146 to 53.852, F=3.59 to 5.93, and ω=41.53 to 14.87.

TABLE 1

| Face No. | R | D | Nd | vd |
|---|---|---|---|---|
| 1 | 35.22784 | 1.30000 | 1.84666 | 23.7800 |
| 2 | 25.43981 | 5.58108 | 1.69680 | 55.5300 |
| 3 | 161.95730 | variable A | | |
| 4 | 66.68463 | 0.97007 | 2.00100 | 29.1300 |
| 5 | 10.93000 | 6.31830 | | |
| 6 | −29.18377 | 0.80000 | 1.69350 | 53.1800 |
| 7 | 26.19043 | 0.09955 | | |
| 8 | 25.80601 | 4.24896 | 1.84666 | 23.7800 |
| 9 | −27.63060 | variable B | | |
| 10 | −20.24167 | 0.80000 | 1.60300 | 65.4400 (S-PHM53) |
| 11 | −50.23484 | variable C | | |
| 12 | ∞ (diaphragm) | 1.45001 | | |
| 13 | 15.31467 | 3.43574 | 1.51633 | 64.0600 |
| 14 | −38.17926 | 0.10000 | | |
| 15 | 21.44923 | 3.93180 | 1.53172 | 48.8400 |
| 16 | −17.87906 | 1.45000 | 1.83400 | 37.1600 |
| 17 | 19.58694 | variable D | | |
| 18 | 19.29863 | 4.94809 | 1.58913 | 61.1500 |
| 19 | −19.58674 | 0.23493 | | |
| 20 | 48.01352 | 0.80173 | 1.90366 | 31.3200 |
| 21 | 16.49362 | variable E | | |
| 22 | ∞ | 0.70000 | 1.53770 | 66.6000 |
| 23 | ∞ | 1.50000 | | |
| 24 | ∞ | 0.70000 | 1.50000 | 64.0000 |
| 25 | ∞ | | | |

Specific data on the aspheric surfaces of the zoom lens 10 in FIG. 1 are as follows. The values herein are such that 3.86766E-12 denotes $3.86766*10^{-12}$, for example.

$6^{th}$ Surface
K=0
A4=−1.12571E-05
A6=1.21899E-07
A8=2.76874E-09
A10=−4.5160E-11
A12=1.38009E-13

$7^{th}$ Surface
K=0
A4=−4.98762E-05
A6=3.02710E-07
A8=−1.83352E-09
A10=−4.9553E-12

$13^{th}$ Surface
K=0
A4=−2.23034E-05
A6=−3.30061E-08
A8=1.96596E-09
A10=−4.33079E-11

$14^{th}$ Surface
K=0
A4=−6.86789E-06
A6=1.59127E-07
A8=−8.05125E-10
A10=−2.46291E-11

$18^{th}$ Surface
K=−4.76959
A4=−2.06414E-06
A6=−1.71695E-07
A8=−2.33143E-09
A10=6.08643E-12

$19^{th}$ Surface
K=0.25043
A4=3.72591E-05
A6=−4.11291E-08
A8=−2.02648E-09
A10=3.86766E-12

In the first embodiment the third lens group III is made of a glass material, S-PHM53 with vd=65.44 and θg, F=0.5401, manufactured by Ohara Inc.

The following table 2 shows variable amounts among the lenses in question in the table 1.

TABLE 2

| | Focal length | | |
|---|---|---|---|
| | 16.146 | 29.487 | 53.852 |
| Variable A | 0.43999 | 6.06511 | 16.38637 |
| Variable B | 2.90306 | 3.44128 | 4.32097 |
| Variable C | 17.67216 | 7.91475 | 2.59996 |
| Variable D | 5.29575 | 2.75180 | 1.65000 |
| Variable E | 27.52876 | 40.70828 | 54.51902 |

Figure 2:
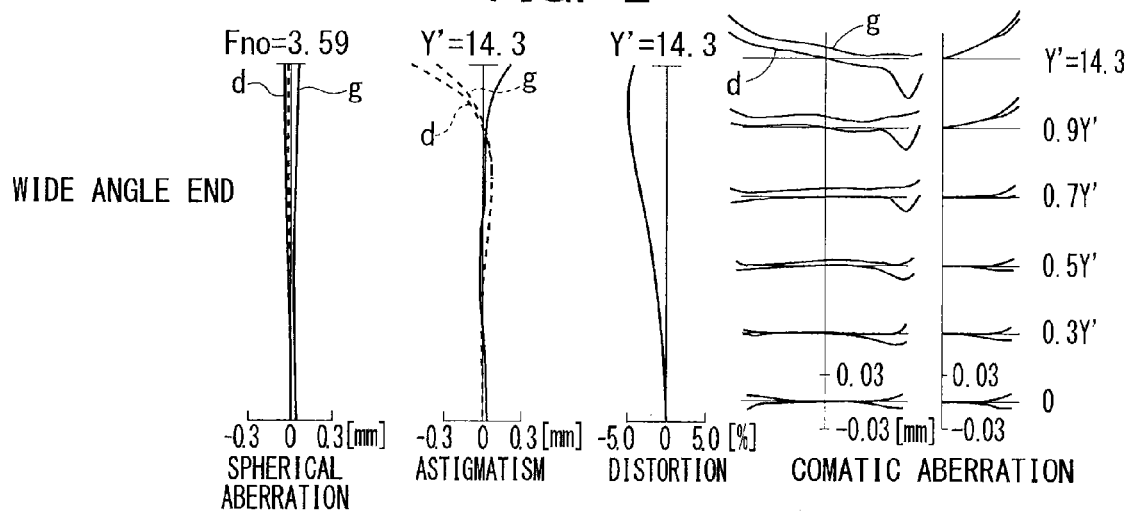
FIG. 2 shows the aberration curves of the zoom lens at wide angle end according to the first embodiment.
Figure 3:
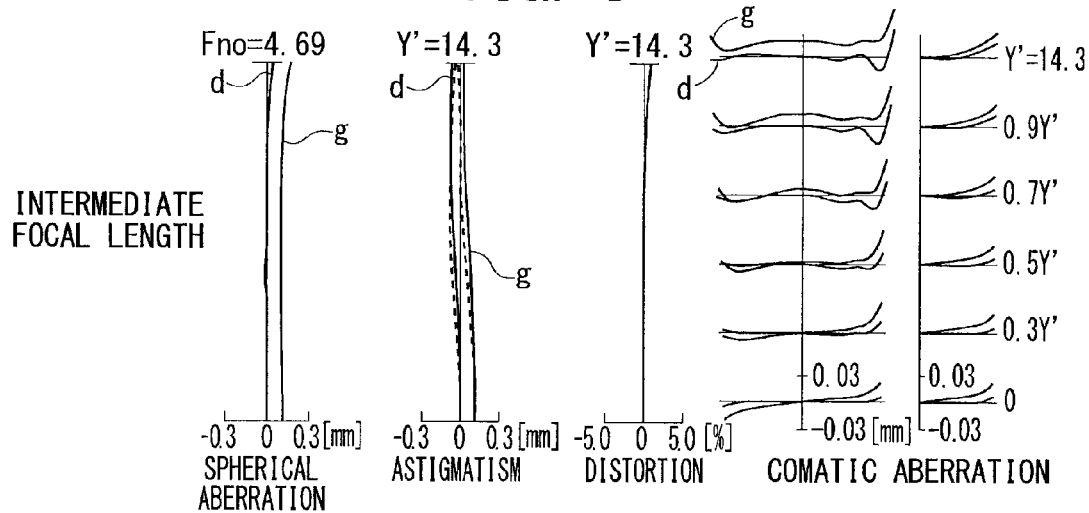
FIG. 3 shows the aberration curves of the zoom lens at intermediate focal length according to the first embodiment.
Figure 4:
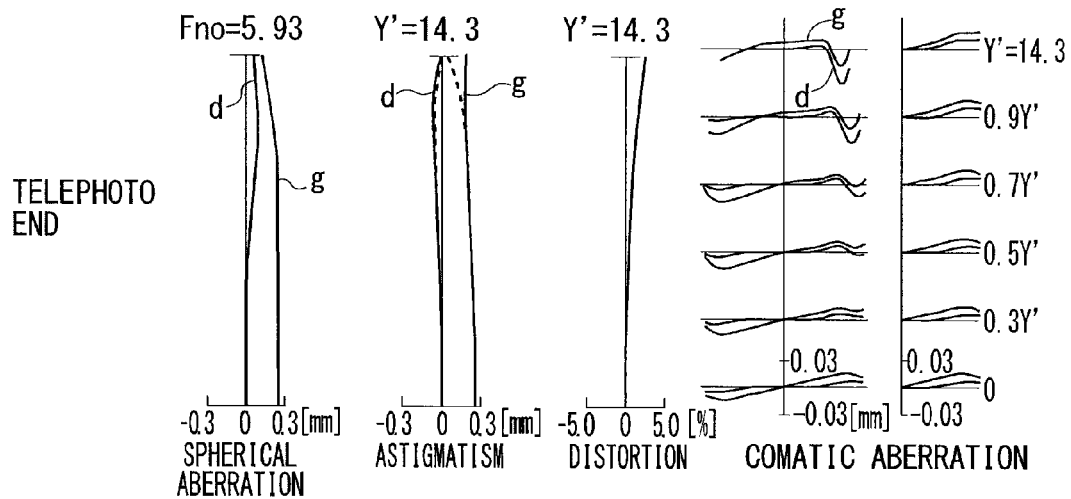
FIG. 4 shows the aberration curves of the zoom lens at telephoto end according to the first embodiment.

FIGS. 2 to 4 show the aberration curves of the zoom lens 10 according to the first embodiment at wide angle end, intermediate focal length, and telephoto end, respectively. In the drawings d denotes a D line and g denotes a G line. In the spherical aberration, the broken line indicates sine condition, and in the astigmatism, the solid line indicates sagittal light beam and the broken line indicates meridional light beam.

Second Embodiment

Figure 5:
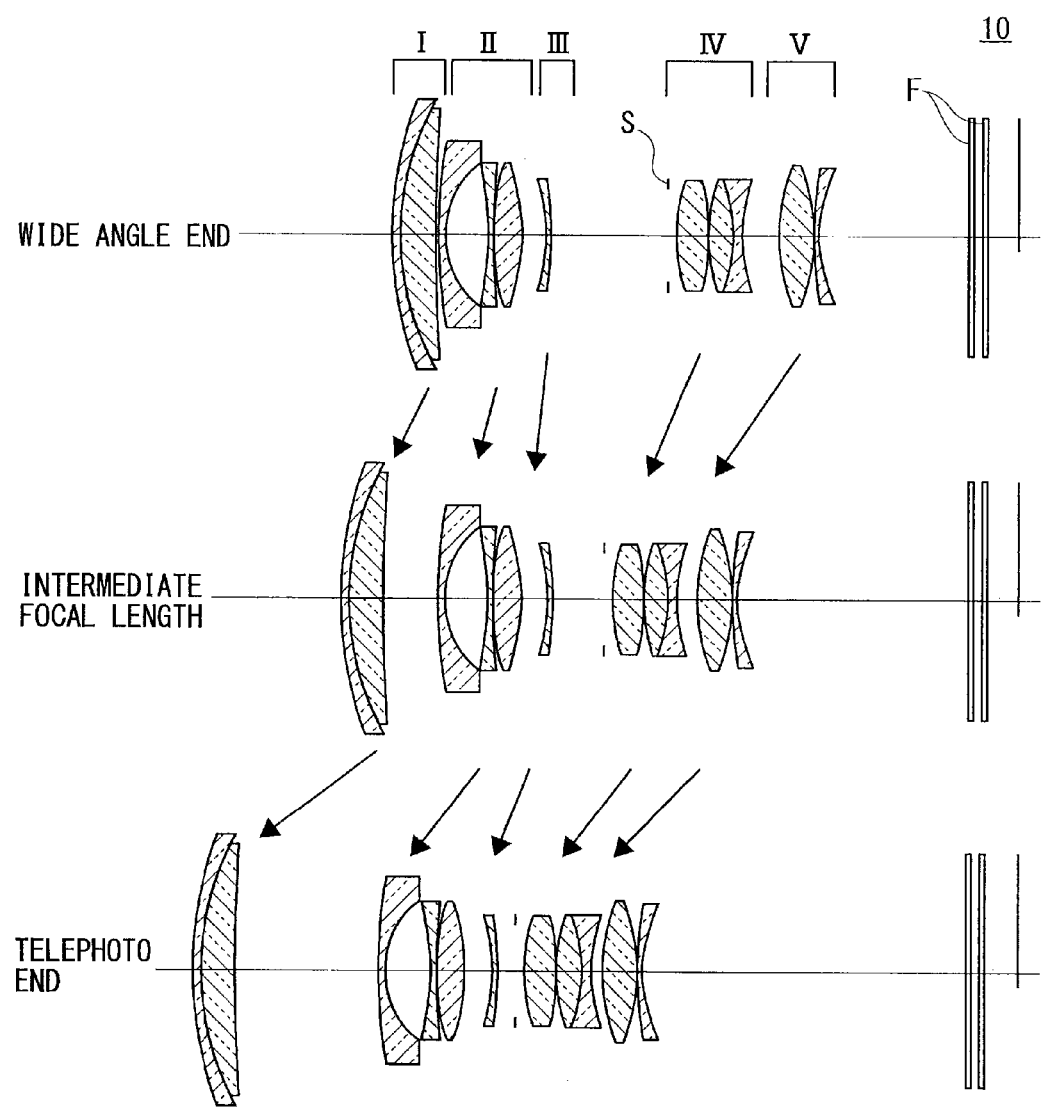
FIG. 5 shows the configuration of a zoom lens according to a second embodiment.

The following table 3 shows specific data on the zoom lens 10 in FIG. 5 with f=16.146 to 53.851, F=3.60 to 5.77, and ω=41.53 to 14.87

TABLE 3

| Face No. | R | D | Nd | vd |
|---|---|---|---|---|
| 1 | 43.11718 | 1.29999 | 1.84666 | 23.78 |
| 2 | 31.73933 | 5.57706 | 1.69680 | 55.53 |
| 3 | 190.09719 | variable A | | |
| 4 | 55.24695 | 0.97008 | 2.00100 | 29.13 |
| 5 | 10.53158 | 7.00758 | | |
| 6 | −37.69153 | 0.80000 | 1.69350 | 53.18 |
| 7 | 39.79764 | 0.12000 | | |
| 8 | 35.75261 | 4.22772 | 1.84666 | 23.78 |
| 9 | −27.02142 | variable B | | |
| 10 | −22.16816 | 0.80000 | 1.60300 | 65.44 (S-PHM53) |
| 11 | −68.86241 | variable C | | |
| 12 | ∞ (diaphragm) | 1.45020 | | |
| 13 | 17.70983 | 4.99510 | 1.51633 | 64.06 |
| 14 | −25.76032 | 0.10000 | | |
| 15 | 24.82196 | 3.73181 | 1.53172 | 48.84 |
| 16 | −18.83887 | 1.44999 | 1.83400 | 37.16 |
| 17 | 19.93203 | variable D | | |
| 18 | 18.95445 | 5.30000 | 1.58913 | 61.15 |
| 19 | −22.79198 | 0.10000 | | |
| 20 | 46.10650 | 0.80000 | 1.90366 | 31.32 |
| 21 | 16.80062 | variable E | | |
| 22 | ∞ | 0.70000 | 1.53770 | 66.60 |
| 23 | ∞ | 1.50000 | | |
| 24 | ∞ | 0.70000 | 1.50000 | 64.00 |
| 25 | ∞ | | | |

Specific data on the aspheric surfaces of the zoom lens 10 according to the second embodiment are as follows.

$6^{th}$ Surface
K=0
A4=−6.13912E-05
A6=6.02764E-07
A8=−3.68927E-09
A10=−5.86282E-12

$7^{th}$ Surface
K=0
A4=−9.55771E-05
A6=6.67024E-07
A8=−5.78157E-09
A10=3.44512E-12

$13^{th}$ Surface
K=0
A4=−2.21195E-05
A6=−1.07672E-06
A8=1.98544E-08
A10=−3.47093E-10

$14^{th}$ Surface
K=0
A4=5.12674E-06
A6=−9.94310E-07
A8=1.53589E-08
A10=−2.78900E-10

$18^{th}$ Surface
K=−1.2879
A4=−1.57778E-05
A6=−7.80973E-08
A8=−8.69905E-10
A10=3.89552E-12

$19^{th}$ Surface
K=0.98584
A4=4.43195E-05
A6=5.66872E-08
A8=−2.64609E-09
A10=1.33387E-11

In the second embodiment the third lens group III is made of a glass material, S-PHM53 with vd=65.44 and θg, F=0.5401, manufactured by Ohara Inc.

The following table 4 shows variable amounts among the lenses in question in the table 3.

TABLE 4

| | Focal length | | |
|---|---|---|---|
| | 16.14596 | 29.48643 | 53.85135 |
| Variable A | 0.44012 | 8.55784 | 22.14102 |
| Variable B | 3.74070 | 3.93725 | 4.34529 |
| Variable C | 18.45697 | 8.08099 | 2.59987 |
| Variable D | 5.92655 | 3.05743 | 1.65001 |
| Variable E | 28.29985 | 41.24833 | 54.53266 |

Figure 6:
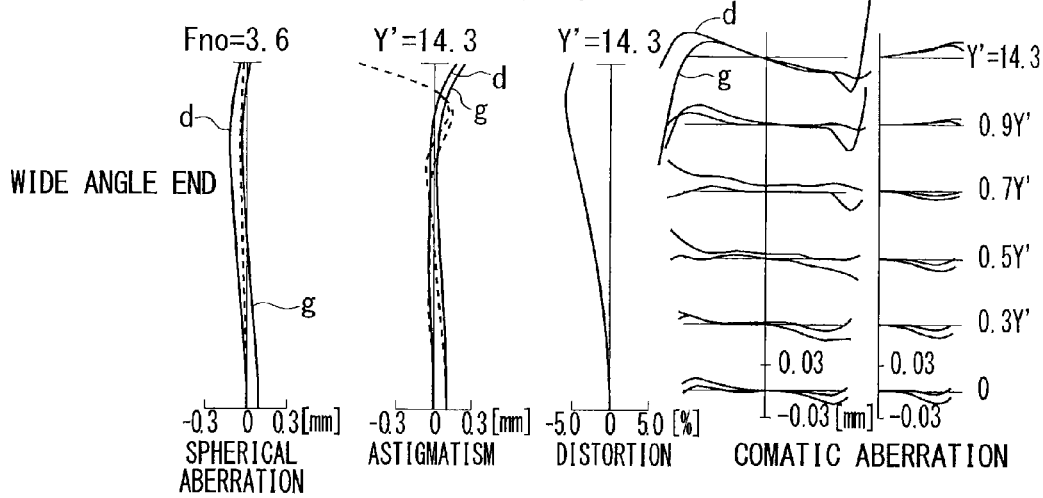
FIG. 6 shows the aberration curves of the zoom lens at wide angle end according to the second embodiment.
Figure 7:
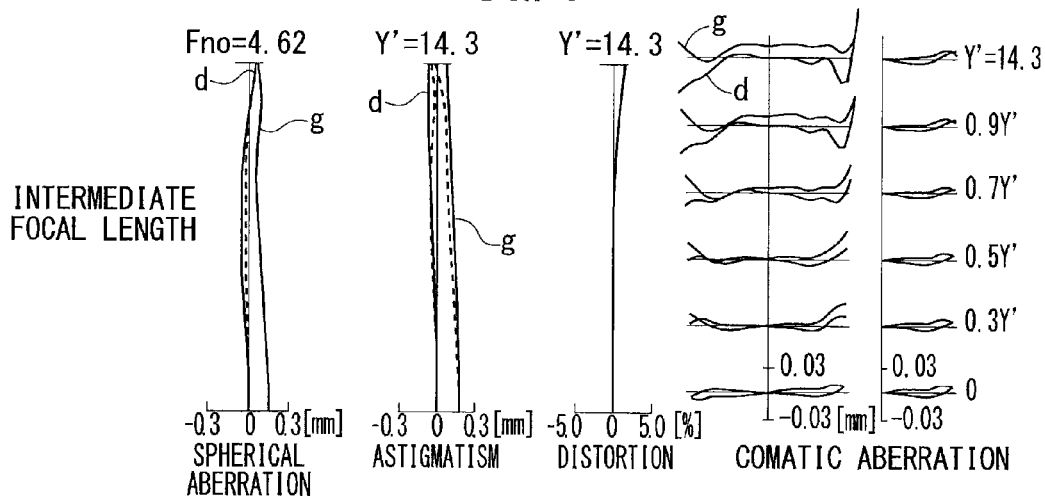
FIG. 7 shows the aberration curves of the zoom lens at intermediate focal length according to the second embodiment.
Figure 8:
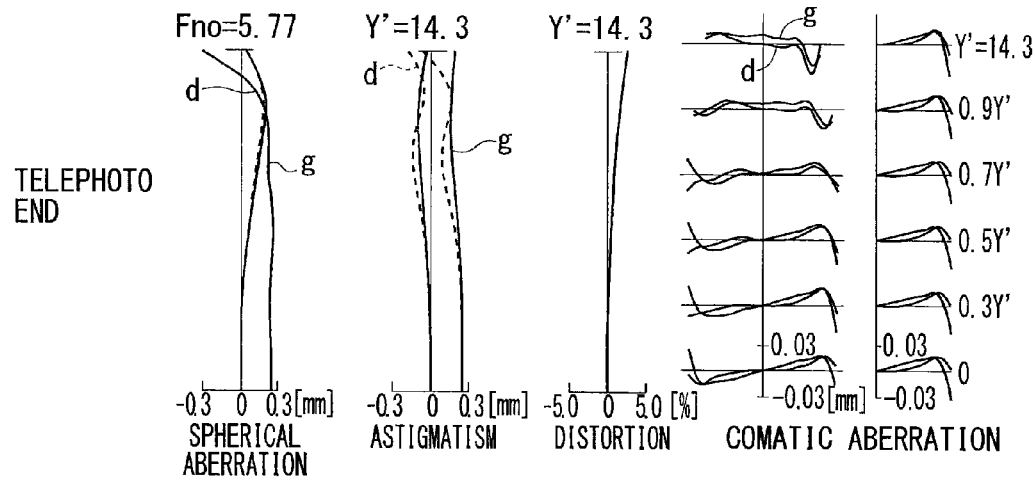
FIG. 8 shows the aberration curves of the zoom lens at telephoto end according to the second embodiment.

FIG. 6 to FIG. 8 show the aberration curves of the zoom lens 10 according to the second embodiment at wide angle end, intermediate focal length, and telephoto end, respectively.

Third Embodiment

Figure 9:
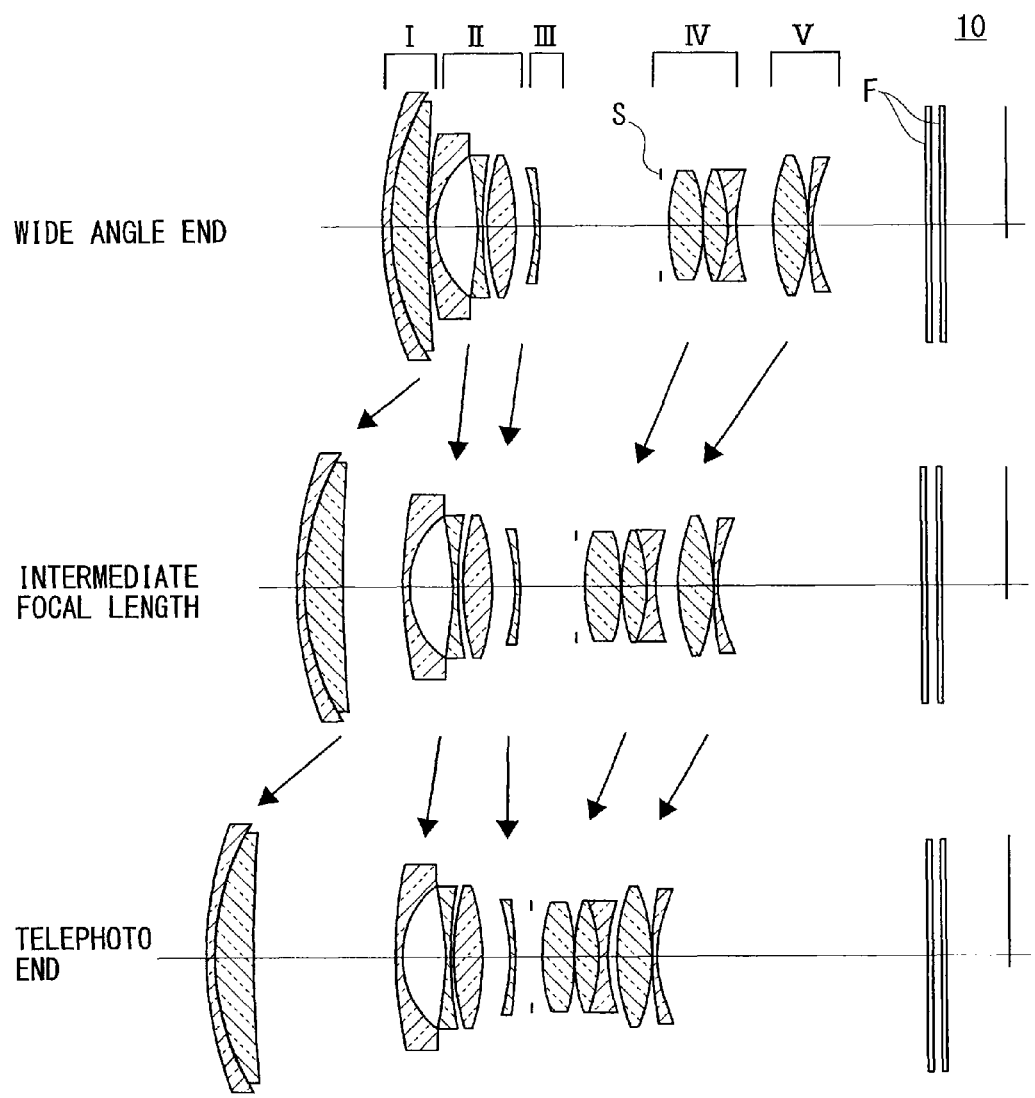
FIG. 9 shows the configuration of a zoom lens according to a third embodiment.

The following table 5 shows specific data on the zoom lens 10 in FIG. 9 with f=16.146 to 53.85, F=3.62 to 5.67, and ω=41.53 to 14.87.

TABLE 5

| Face No. | R | D | Nd | vd |
|---|---|---|---|---|
| 1 | 44.83622 | 1.30000 | 1.84666 | 23.78 |
| 2 | 30.32788 | 5.80250 | 1.77250 | 49.60 |
| 3 | 152.20233 | variable A | | |
| 4 | 55.56877 | 0.97009 | 2.00100 | 29.13 |
| 5 | 10.85110 | 6.67902 | | |
| 6 | −40.92454 | 0.80000 | | |
| 7 | 36.32245 | 0.65885 | | |
| 8 | 30.89732 | 4.44422 | 1.84666 | 23.78 |
| 9 | −26.99833 | variable B | | |
| 10 | −24.45877 | 0.80000 | 1.64850 | 53.02 (S-BSM71) |
| 11 | −103.58339 | variable C | | |
| 12 | ∞ (diaphragm) | 1.45008 | | |
| 13 | 16.52481 | 5.35383 | 1.51633 | 64.06 |
| 14 | −25.99633 | 0.10000 | | |
| 15 | 23.78029 | 3.61747 | 1.51742 | 52.43 |
| 16 | −22.01894 | 1.45000 | 1.83400 | 37.16 |
| 17 | 17.55937 | variable D | | |
| 18 | 19.88520 | 5.30000 | 1.58913 | 61.15 |
| 19 | −22.74438 | 0.10000 | | |
| 20 | 53.58387 | 0.80000 | 1.90366 | 31.32 |
| 21 | 18.67841 | variable E | | |
| 22 | ∞ | 0.70000 | 1.53770 | 66.60 |
| 23 | ∞ | 1.50000 | | |
| 24 | ∞ | 0.70000 | 1.50000 | 64.00 |
| 25 | ∞ | | | |

Specific data on the aspheric surfaces of the zoom lens 10 according to the third embodiment are as follows.

$6^{th}$ Surface
K=0
A4=−8.18151E-06
A6=−2.01833E-07
A8=2.53333E-09
A10=−1.29107E-11

$7^{th}$ Surface
K=0
A4=−3.23283E-05
A6=−1.88341E-07
A8=1.96755E-09
A10=−1.43273E-11

$13^{th}$ Surface
K=0
A4=−3.22004E-05
A6=−9.60992E-07
A8=1.55589E-08
A10=−2.82657E-10

$14^{th}$ Surface
K=0
A4=3.53815E-06
A6=−8.66214E-07
A8=1.17377E-08
A10=−2.24402E-10

$18^{th}$ Surface
K=−1.27337
A4=−1.58768E-05
A6=−1.86624E-07
A8=6.94712E-10
A10=−5.97184E-12

$19^{th}$ Surface
K=0
A4=3.31640E-05
A6=−1.06067E-07
A8=−6.29723E-10
A10=0

In the third embodiment the third lens group III is made of a glass material, S-BSM71 with vd=53.02 and θg, F=0.5547, manufactured by Ohara Inc.

The following table 6 shows variable amounts among the lenses in question in the table 5.

TABLE 6

| | Focal length | | |
|---|---|---|---|
| | 16.15 | 29.49 | 53.85 |
| Variable A | 0.44000 | 8.87257 | 22.67111 |
| Variable B | 2.87666 | 3.12901 | 4.33617 |
| Variable C | 19.29016 | 8.43762 | 2.59994 |
| Variable D | 6.18178 | 3.32394 | 1.65001 |
| Variable E | 27.38221 | 39.66109 | 51.81615 |

FIG. 10 to FIG. 12 show the aberration curves of the zoom lens 10 according to the third embodiment at wide angle end, intermediate focal length, and telephoto end, respectively.

Fourth Embodiment

The following table 7 shows specific data on the zoom lens 10 in FIG. 13 with f=16.146 to 53.852, F=3.68 to 5.97, and ω=41.53 to 14.87.

TABLE 7

| Face No. | R | D | Nd | vd |
|---|---|---|---|---|
| 1 | 34.95704 | 1.30001 | 1.84666 | 23.78 |
| 2 | 23.60593 | 5.86984 | 1.741 | 52.64 |
| 3 | 151.1807 | variable A | | |
| 4 | 299.95707 | 0.97009 | 2.001 | 29.13 |
| 5 | 11.13285 | 4.29663 | | |
| 6 | −70.40818 | 0.8 | 1.8086 | 40.42 |
| 7 | 36.93918 | 0.99318 | | |
| 8 | 25.74916 | 3.66798 | 1.84666 | 23.78 |
| 9 | −25.74916 | variable B | | |
| 10 | −18.53351 | 0.8 | 1.58913 | 61.14 (S-BAL35) |
| 11 | −393.50471 | variable C | | |
| 12 | ∞ | 1.44993 | | |
| 13 | 15.66887 | 4.15645 | 1.48749 | 70.23 |
| 14 | −27.94159 | 0.1 | | |
| 15 | 13.07805 | 3.77258 | 1.53172 | 48.84 |
| 16 | −26.8818 | 2.00933 | 1.834 | 37.16 |
| 17 | 12.0058 | variable D | | |
| 18 | 24.19269 | 5.29997 | 1.58913 | 61.15 |
| 19 | −13.20634 | 0.37853 | | |
| 20 | −19.02546 | 0.79998 | 1.90366 | 31.32 |
| 21 | −138.0287 | variable E | | |
| 22 | ∞ | 0.7 | 1.5168 | 64.2 |
| 23 | ∞ | 1.5 | | |
| 24 | ∞ | 0.7 | 1.5168 | 64.2 |

Specific data on the aspheric surfaces of the zoom lens 10 according to the fourth embodiment are as follows.
$6^{th}$ Surface
K=0.0
A4=−3.843970E-05
A6=1.211950E-07
A8=−5.466700E-09
A10=3.589930E-11
A12=5.576910E-13
7th surface
K=0.0
A4=−6.229330E-05
A6=1.289240E-07
A8=−9.269550E-09
A10=1.049680E-10
$13^{th}$ Surface
K=0.0
A4=4.838910E-06
A6=−2.840070E-07
A8=8.697220E-09
A10=−1.836370E-11
$14^{th}$ Surface
K=0.0
A4=4.698360E-05
A6=−1.627670E-07
A8=5.742440E-09
A10=2.564070E-11
$18^{th}$ surface
K=−1.373112
A4=1.668360E-05
A6=1.266830E-07
A8=−5.146740E-09
A10=1.518190E-10
$19^{th}$ Surface
K=−2.895300E-02
A4=7.250660E-05
A6=6.967700E-07
A8=−1.676340E-08
A10=2.591100E-10

In the fourth embodiment the third lens group III is made of a glass material, S-BAL35 with vd=61.14 and θg, F=0.5407, manufactured by Ohara Inc.

The following table 8 shows variable amounts among the lenses in question in the table 7.

TABLE 8

| | Focal length | | |
|---|---|---|---|
| | 16.15 | 29.49 | 53.85 |
| Variable A | 0.66174 | 6.7367 | 18.34407 |
| Variable B | 2.4583 | 2.84657 | 4.01201 |
| Variable C | 16.66876 | 7.46702 | 2.60012 |
| Variable D | 5.11922 | 2.44084 | 1.86599 |
| Variable E | 22.5897 | 33.94981 | 42.86191 |

Figure 14:
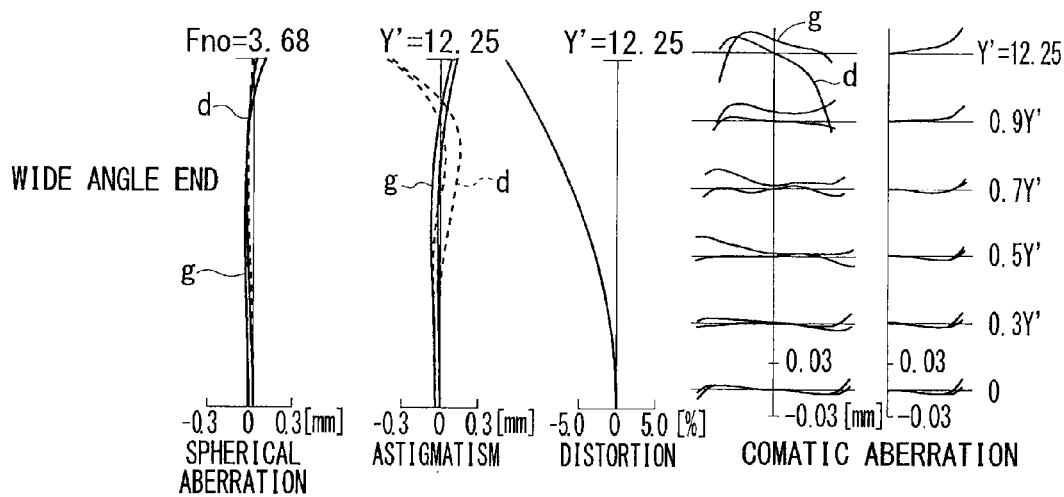
FIG. 14 shows the aberration curves of the zoom lens at wide angle end according to the fourth embodiment.
Figure 15:
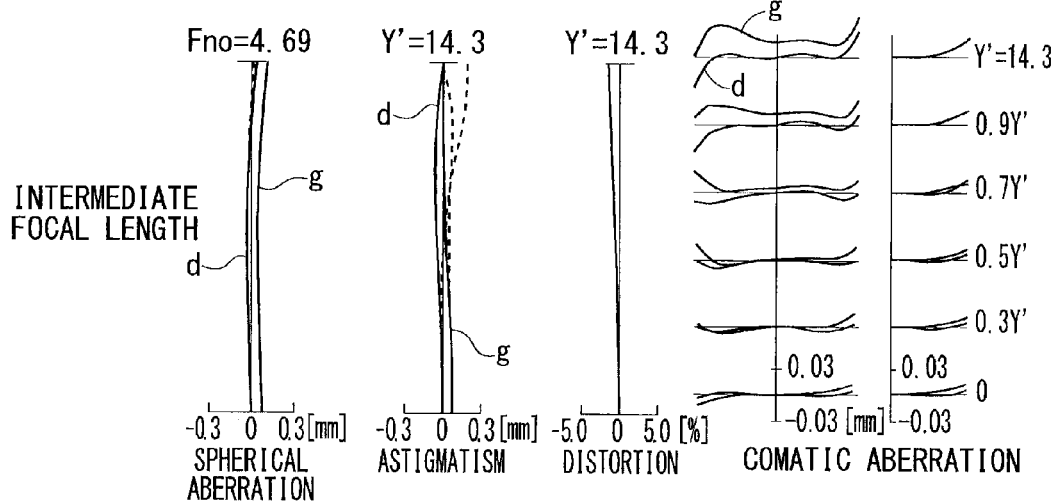
FIG. 15 shows the aberration curves of the zoom lens at intermediate focal length according to the fourth embodiment.
Figure 16:
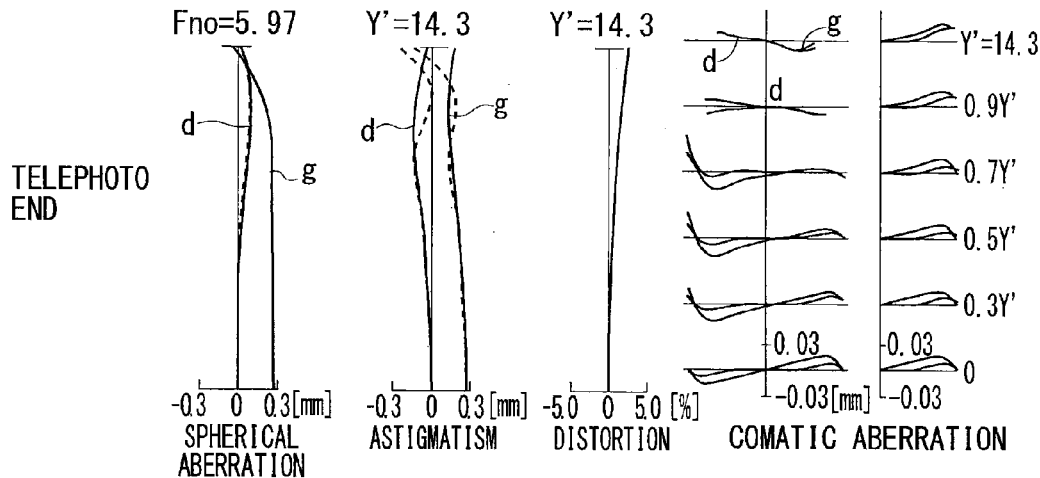
FIG. 16 shows the aberration curves of the zoom lens at telephoto end according to the fourth embodiment.

FIGS. 14 to 16 show the aberration curves of the zoom lens 10 according to the fourth embodiment at wide angle end, intermediate focal length, and telephoto end, respectively. In the present embodiment the maximal image height Y' is 12.25 at wide angle end and a large distortion has occurred. However, distortion at wide angle end is set to be corrected by a known distortion correcting algorithm using image data from the image sensor so that the maximal image height is to be 14.3 mm.

Fifth Embodiment

Figure 17:
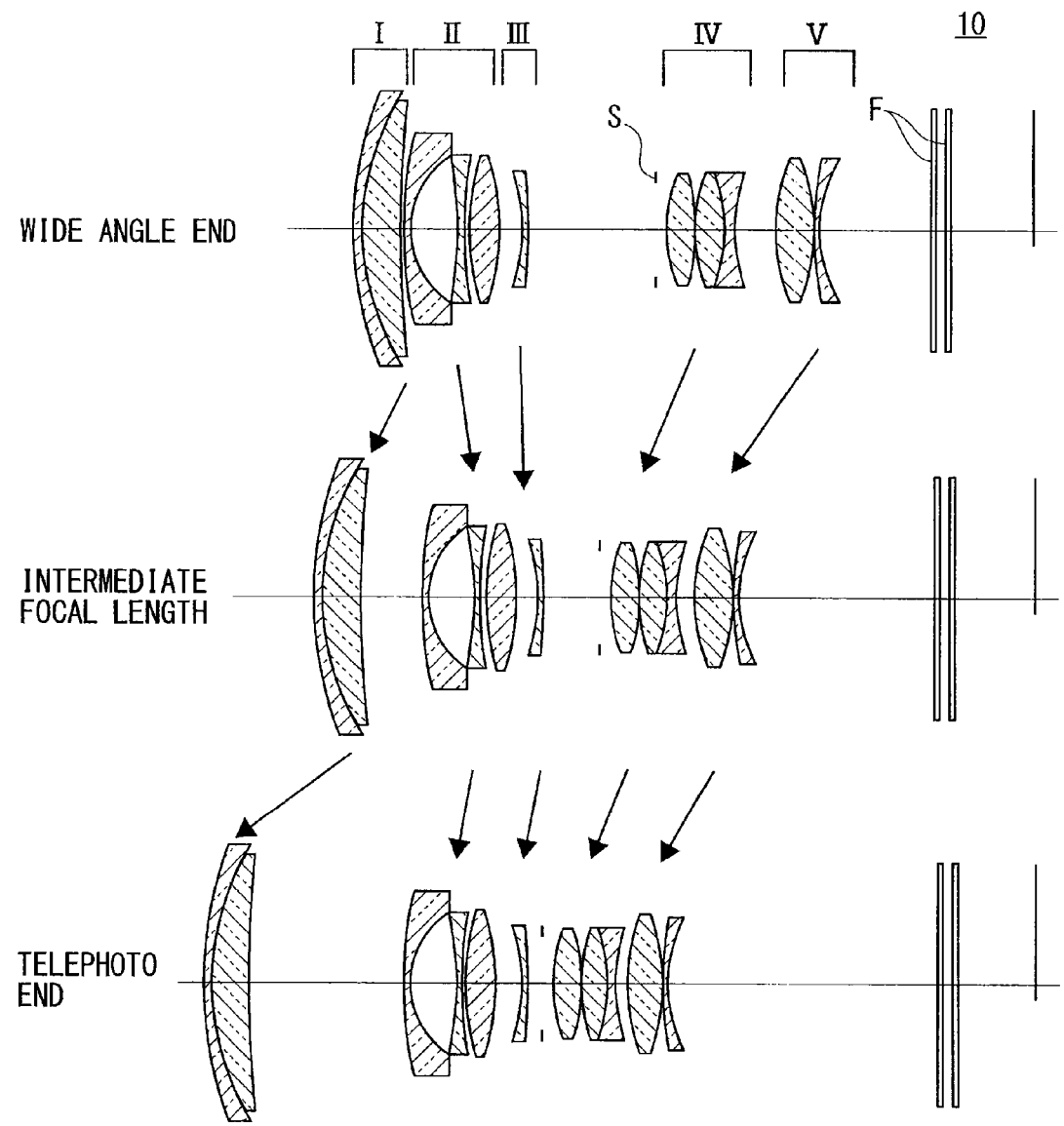
FIG. 17 shows the configuration of a zoom lens according to a fifth embodiment.

The following table 9 shows specific data on the zoom lens 10 in FIG. 17 with f=16.146 to 53.84, F=3.63 to 5.74, and ω=41.50 to 14.87.

TABLE 9

| Face No. | R | D | Nd | vd |
|---|---|---|---|---|
| 1 | 46.03179 | 1.30005 | 1.84666 | 23.78 |
| 2 | 31.22940 | 5.51888 | 1.77250 | 49.60 |
| 3 | 152.04501 | variable A | | |
| 4 | 51.07120 | 0.97002 | 2.00100 | 29.13 |
| 5 | 10.77721 | 6.63709 | | |
| 6 | −42.16678 | 0.79999 | 1.77030 | 47.40 |
| 7 | 38.75553 | 0.96368 | | |
| 8 | 30.38725 | 4.33203 | 1.84666 | 23.78 |
| 9 | −29.02408 | variable B | | |
| 10 | −21.91807 | 0.80000 | 1.64850 | 53.02 (S-BSM71) |
| 11 | −79.56447 | variable C | | |

TABLE 9-continued

| Face No. | R | D | Nd | vd |
|---|---|---|---|---|
| 12 | ∞ (diaphragm) | 1.44994 | | |
| 13 | 18.62497 | 4.02774 | 1.51633 | 64.06 |
| 14 | −25.81393 | 0.09995 | | |
| 15 | 20.81187 | 4.01271 | 1.51742 | 52.43 |
| 16 | −19.74213 | 1.44999 | 1.83400 | 37.16 |
| 17 | 19.22015 | variable D | | |
| 18 | 20.95766 | 5.30002 | 1.58913 | 61.15 |
| 19 | −22.01066 | 0.10001 | | |
| 20 | 42.36060 | 0.79999 | 1.90366 | 31.32 |
| 21 | 16.44550 | variable E | | |
| 22 | ∞ | 0.70000 | 1.53770 | 66.60 |
| 23 | ∞ | 1.50000 | | |
| 24 | ∞ | 0.70000 | 1.50000 | 64.00 |
| 25 | ∞ | | | |

Specific data on the aspheric surfaces of the zoom lens 10 according to the fifth embodiment are as follows.

$6^{th}$ Surface
K=0
A4=5.52979E−05
A6=−1.46723E−06
A8=1.40955E−08
A10=−5.75258E−11
$7^{th}$ Surface
K=0
A4=3.02092E−05
A6=−1.53901E−06
A8=1.44769E−08
A10=−6.26901E−11
$13^{th}$ Surface
K=0
A4=−8.40542E−06
A6=−4.37152E−07
A8=1.03740E−08
A10=−2.45238E−10
$14^{th}$ Surface
K=0
A4=2.47361E−05
A6=−6.21729E−07
A8=1.37690E−08
A10=−2.72842E−10
$18^{th}$ surface
K=−0.92674
A4=−1.83059E−05
A6=−3.30349E−08
A8=−2.28321E−09
A10=−6.15846E−13
$19^{th}$ surface
K=0
A4=3.19375E−05
A6=3.31577E−08
A8=−2.88956E−09
A10=0

In the fifth embodiment the third lens group III is made of a glass material, S-BSM71 with vd=53.02 and θg, F=0.5547, manufactured by Ohara Inc.

The following table 10 shows variable amounts among the lenses in question in the table 9.

TABLE 10

| | Focal length | | |
|---|---|---|---|
| | 16.14591 | 29.48378 | 53.84341 |
| Variable A | 0.47981 | 8.94913 | 23.54063 |
| Variable B | 3.46925 | 3.31521 | 4.34035 |
| Variable C | 18.75306 | 8.22939 | 2.59987 |

TABLE 10-continued

| | Focal length | | |
|---|---|---|---|
| | 16.14591 | 29.48378 | 53.84341 |
| Variable D | 6.13180 | 2.96958 | 1.64988 |
| Variable E | 27.35054 | 39.92413 | 52.30469 |

FIGS. 18 to 20 show the aberration curves of the zoom lens 10 according to the fifth embodiment at wide angle end, intermediate focal length, and telephoto end, respectively.

Sixth Embodiment

Figure 21:
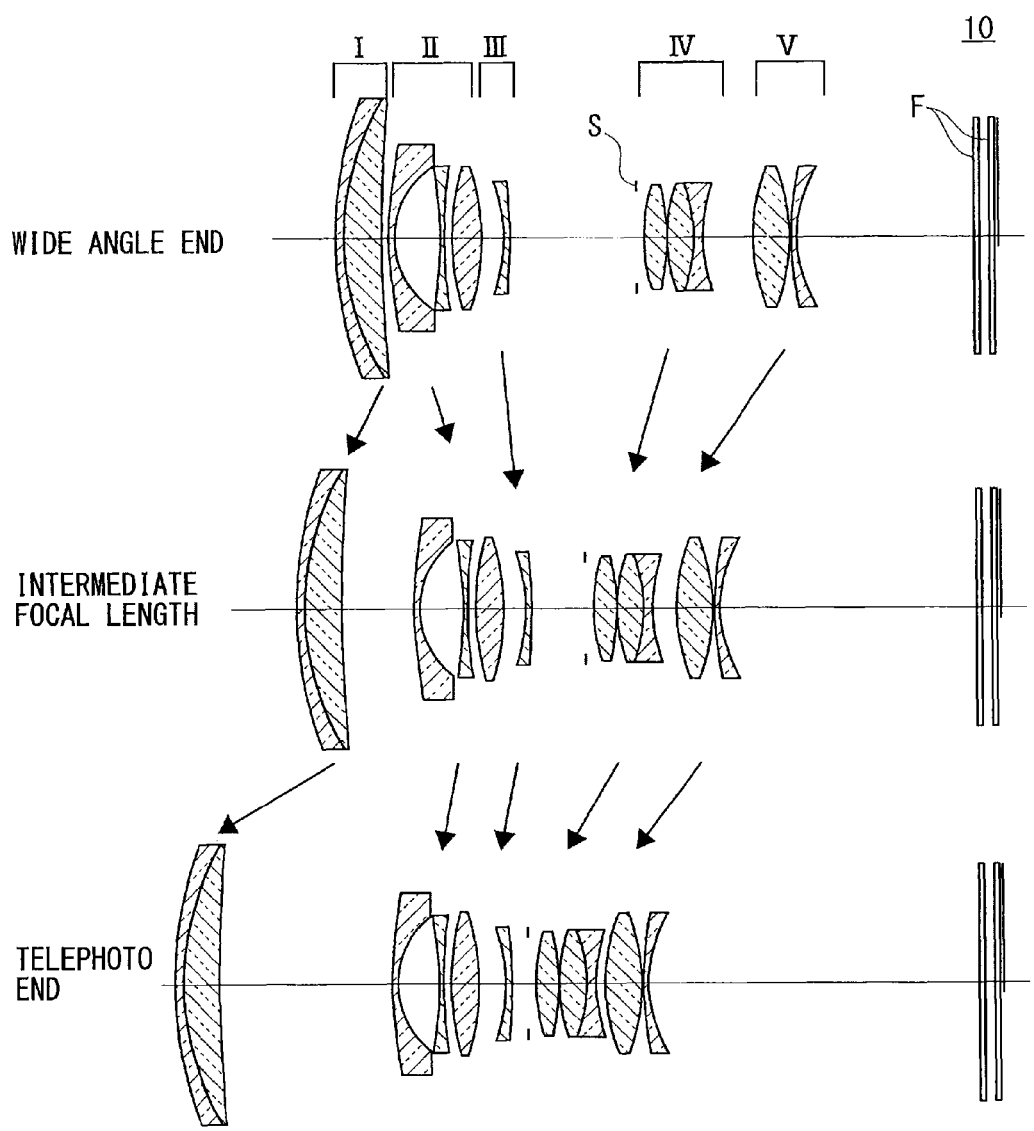
FIG. 21 shows the configuration of a zoom lens according to a sixth embodiment.

The following table 11 shows specific data on the zoom lens 10 in FIG. 21 with f=16.15 to 53.852, F=3.62 to 5.77, and ω=41.53 to 14.87.

TABLE 11

| Face No. | R | D | Nd | vd |
|---|---|---|---|---|
| 1 | 52.97005 | 1.31000 | 1.84666 | 23.78 |
| 2 | 35.71101 | 5.48584 | 1.77250 | 49.60 |
| 3 | 189.65170 | variable A | | |
| 4 | 57.34337 | 0.95497 | 2.00100 | 29.13 |
| 5 | 11.09490 | 6.36289 | | |
| 6 | −52.53144 | 0.80001 | 1.77030 | 47.40 |
| 7 | 36.40322 | 1.16039 | | |
| 8 | 30.42534 | 4.23829 | 1.84666 | 23.78 |
| 9 | −30.42507 | variable B | | |
| 10 | −22.85191 | 0.80000 | 1.64850 | 53.02 (S-BSM71) |
| 11 | −92.38759 | variable C | | |
| 12 | ∞ (diaphragm) | 1.40001 | | |
| 13 | 19.49107 | 3.32058 | 1.51633 | 64.06 |
| 14 | −25.78639 | 0.11538 | | |
| 15 | 18.99577 | 4.01733 | 1.51742 | 52.43 |
| 16 | −18.99577 | 1.40000 | 1.83400 | 37.16 |
| 17 | 18.99577 | variable D | | |
| 18 | 19.38104 | 5.59999 | 1.58913 | 61.15 |
| 19 | −23.21203 | 0.10000 | | |
| 20 | 34.69037 | 0.80000 | 1.90366 | 31.32 |
| 21 | 14.67162 | variable E | | |
| 22 | ∞ | 0.70000 | 1.53770 | 66.60 |
| 23 | ∞ | 1.50000 | | |
| 24 | ∞ | 0.70000 | 1.50000 | 64.00 |
| 25 | ∞ | | | |

Specific data on the aspheric surfaces of the zoom lens 10 according to the sixth embodiment are as follows.

$6^{th}$ surface
K=0
A4=2.63554E−05
A6=−1.09237E−06
A8=9.8447E−09
A10=−3.41409E−11
$7^{th}$ Surface
K=0
A4=2.93738E−06
A6=−1.13624E−06
A8=1.01043E−08
A10=−3.88306E−11
$13^{th}$ surface
K=0
A4=3.21402E−07
A6=−1.03872E−07
A8=6.34622E−09
A10=−1.99948E−10
$14^{th}$ surface
K=0
A4=2.47699E−05
A6=−2.4115E−07

A8=9.50458E-09
A10=−2.36136E-10
18th surface
K=−0.57855
A4=−1.83484E-05
A6=−2.90044E-08
A8=−1.90061E-09
A10=−5.50054E-12
19th surface
K=−0.09961
A4=3.54974E-05
A6=3.4343E-08
A8=−3.14805E-09

In the sixth embodiment the third lens group III is made of a glass material, S-BSM71 with vd=53.02 and θg, F=0.5547, manufactured by Ohara Inc.

The following table 12 shows variable amounts among the lenses in question in the table 11.

TABLE 12

|  | Focal length | | |
|---|---|---|---|
|  | 16.14575 | 29.48616 | 53.85229 |
| Variable A | 1.00003 | 10.71413 | 26.85616 |
| Variable B | 3.49515 | 3.27157 | 4.27495 |
| Variable C | 18.58004 | 8.07056 | 2.49995 |
| Variable D | 26.45879 | 3.30413 | 1.64995 |
| Variable E | 26.45879 | 38.93855 | 51.55163 |

Figure 22:
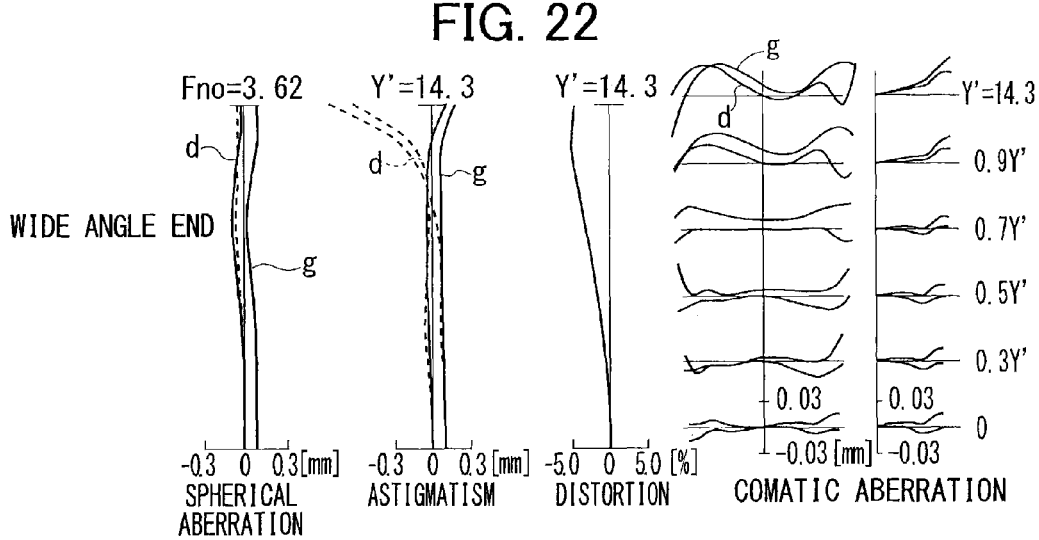
FIG. 22 shows the aberration curves of the zoom lens at wide angle end according to the sixth embodiment.
Figure 23:
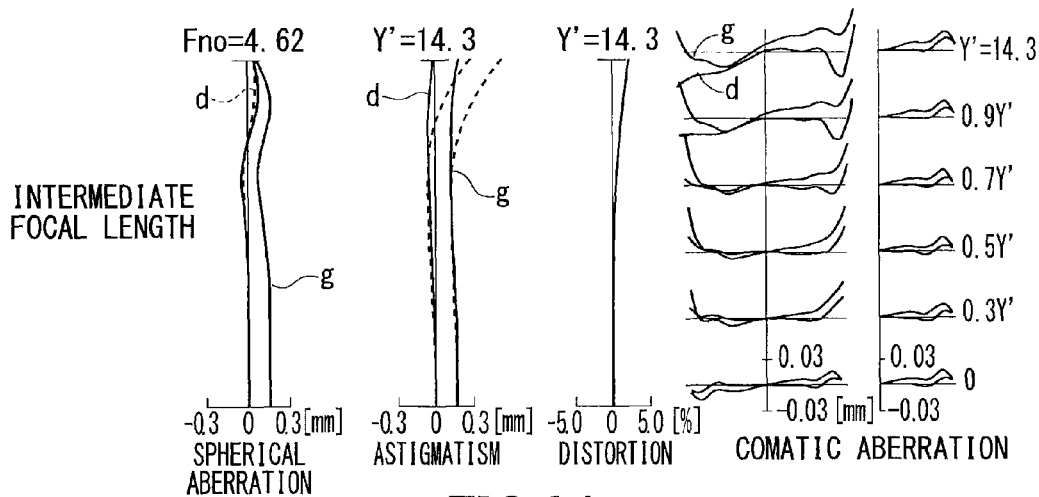
FIG. 23 shows the aberration curves of the zoom lens at intermediate focal length according to the sixth embodiment.
Figure 24:
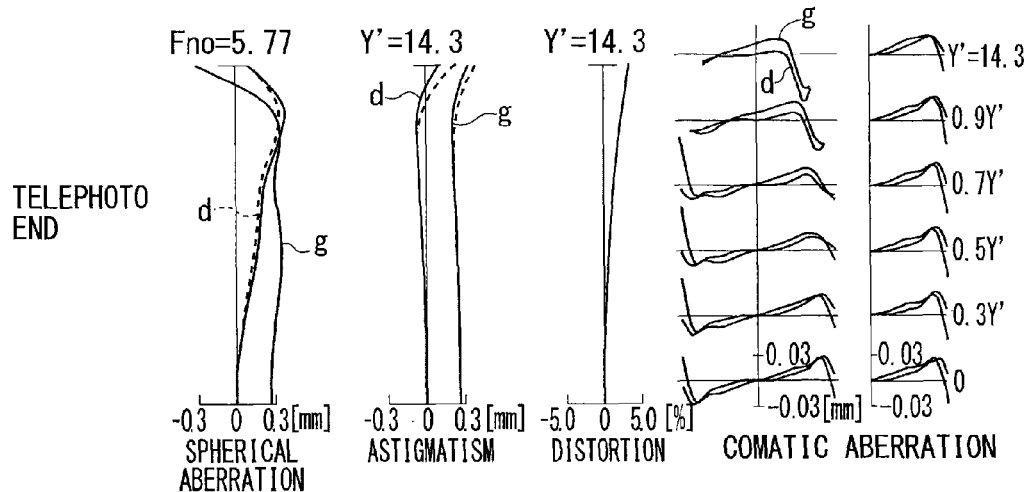
FIG. 24 shows the aberration curves of the zoom lens at telephoto end according to the sixth embodiment.

FIGS. 22 to 24 show the aberration curves of the zoom lens 10 according to the sixth embodiment at wide angle end, intermediate focal length, and telephoto end, respectively.

Seventh Embodiment

Figure 25:
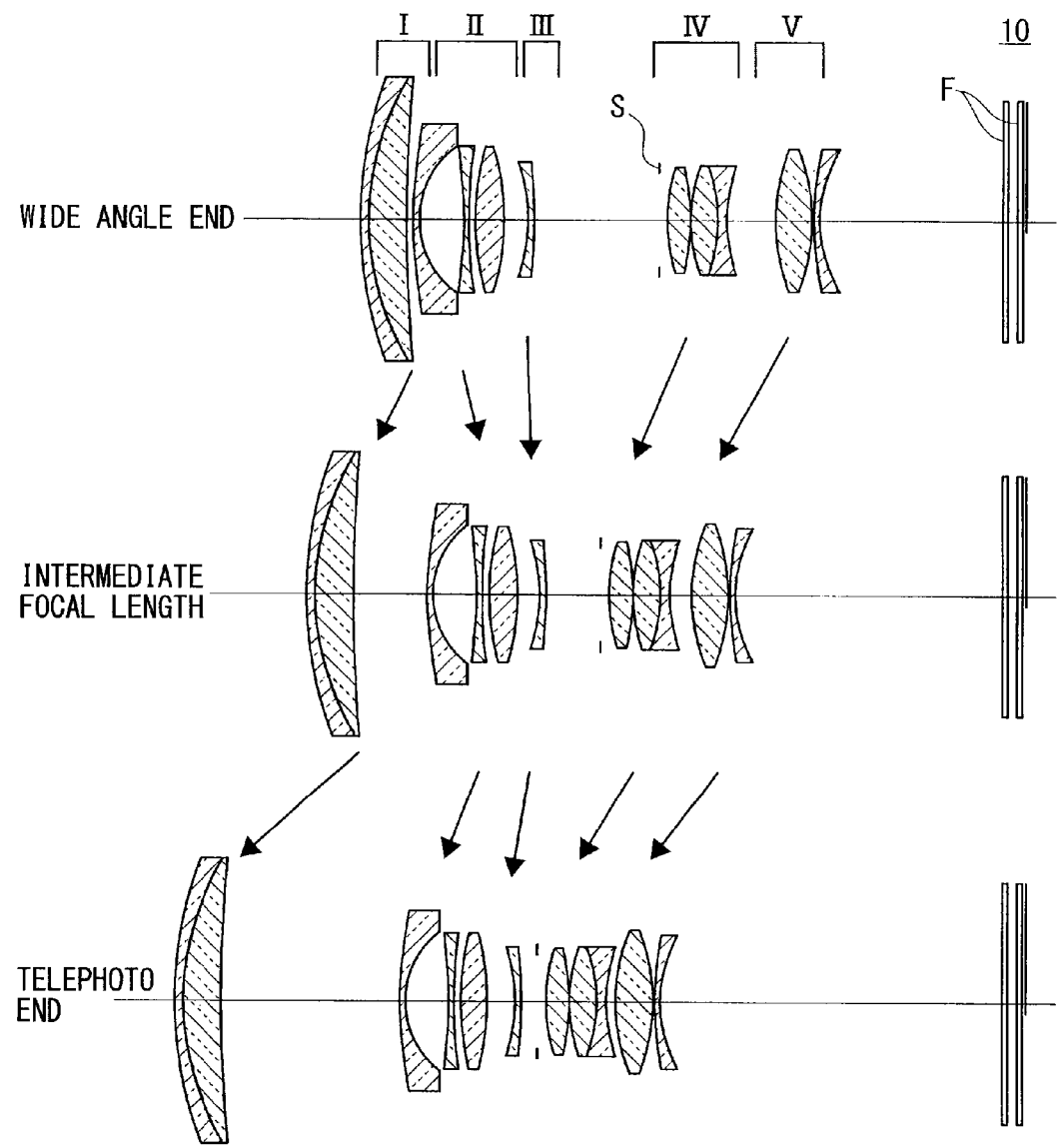
FIG. 25 shows the configuration of a zoom lens according to a seventh embodiment.

The following table 13 shows specific data on the zoom lens 10 in FIG. 25 with f=16.146 to 53.852, F=3.61 to 5.76, and ω=41.53 to 14.87.

TABLE 13

| Face No. | R | D | Nd | vd |
|---|---|---|---|---|
| 1 | 53.02258 | 1.31000 | 1.84666 | 23.78 |
| 2 | 35.94362 | 5.46329 | 1.77250 | 49.60 |
| 3 | 188.67998 | variable A | | |
| 4 | 54.87412 | 0.95512 | 2.00100 | 29.13 |
| 5 | 10.79646 | 6.44587 | | |
| 6 | −51.91885 | 0.80000 | 1.74320 | 49.29 |
| 7 | 40.63394 | 1.06371 | | |
| 8 | 31.38598 | 4.08243 | 1.84666 | 23.78 |
| 9 | −31.38598 | variable B | | |
| 10 | −23.00149 | 0.80000 | 1.65160 | 58.55 (S-LAL7) |
| 11 | −97.40089 | variable C | | |
| 12 | ∞ (diaphragm) | 1.39999 | | |
| 13 | 19.57334 | 3.29549 | 1.51633 | 64.06 |
| 14 | −25.26589 | 0.10000 | | |
| 15 | 19.46405 | 3.89071 | 1.51742 | 52.43 |
| 16 | −19.46405 | 1.40519 | 1.83400 | 37.16 |
| 17 | 19.46405 | variable D | | |
| 18 | 19.69818 | 5.60000 | 1.58913 | 61.15 |
| 19 | −22.10614 | 0.10000 | | |
| 20 | 38.97349 | 0.80019 | 1.90366 | 31.32 |
| 21 | 15.14672 | variable E | | |
| 22 | ∞ | 0.70000 | 1.53770 | 66.60 |
| 23 | ∞ | 1.50000 | | |
| 24 | ∞ | 0.70000 | 1.50000 | 64.00 |
| 25 | ∞ | | | |

Specific data on the aspheric surfaces of the zoom lens 10 according to the seventh embodiment are as follows.
6th Surface
K=0
A4=3.46877E-05
A6=−1.27443E-06
A8=1.11921E-08
A10=−4.40045E-11
7th surface
K=0
A4=6.8617E-06
A6=−1.34447E-06
A8=1.13537E-08
A10=−4.81564E-11
13th surface
K=0
A4=−1.2513E-06
A6=−4.84014E-08
A8=5.40686E-09
A10=−2.0620E-10
14th Surface
K=0
A4=2.71708E-05
A6=−2.3373E-07
A8=9.93932E-09
A10=−2.54318E-10
18th Surface
K=−0.65075
A4=−1.90482E-05
A6=−3.34777E-08
A8=−1.71693E-09
A10=−5.56274E-12
19th Surface
K=−0.20854
A4=3.63343E-05
A6=2.45318E-08
A8=−2.95008E-09

In the seventh embodiment the third lens group III is made of a glass material, S-LAL7 with vd=58.55 and θg, F=0.5425, manufactured by Ohara Inc.

The following table 14 shows variable amounts among the lenses in question in the table 13.

TABLE 14

|  | Focal length | | |
|---|---|---|---|
|  | 16.14586 | 29.48668 | 53.85211 |
| Variable A | 1.00003 | 10.81399 | 27.00555 |
| Variable B | 3.56892 | 3.23901 | 4.21342 |
| Variable C | 18.19944 | 7.95884 | 2.50002 |
| Variable D | 7.23212 | 3.33550 | 1.65001 |
| Variable E | 26.76503 | 39.32439 | 52.06792 |

Figure 26:
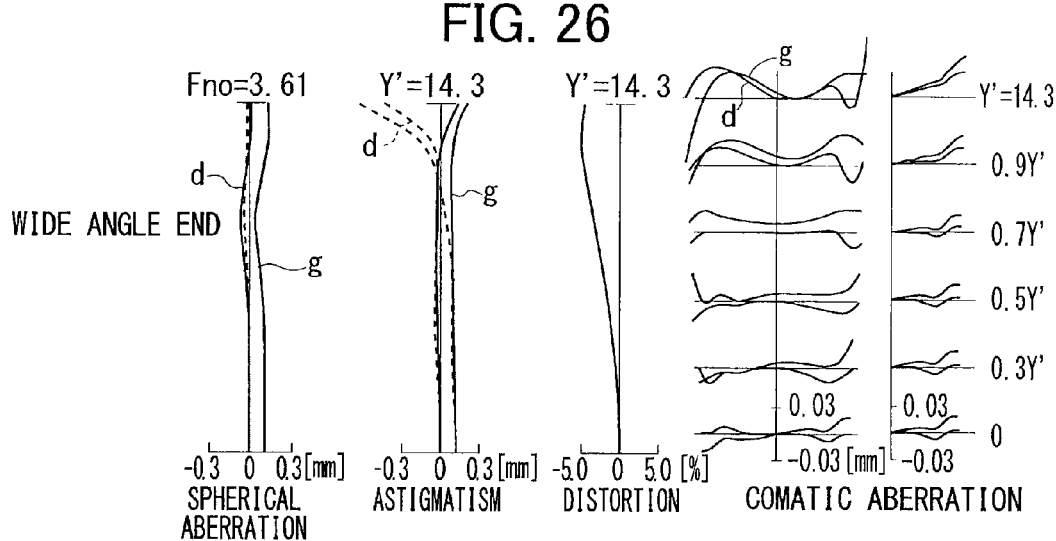
FIG. 26 shows the aberration curves of the zoom lens at wide angle end according to the seventh embodiment.
Figure 27:
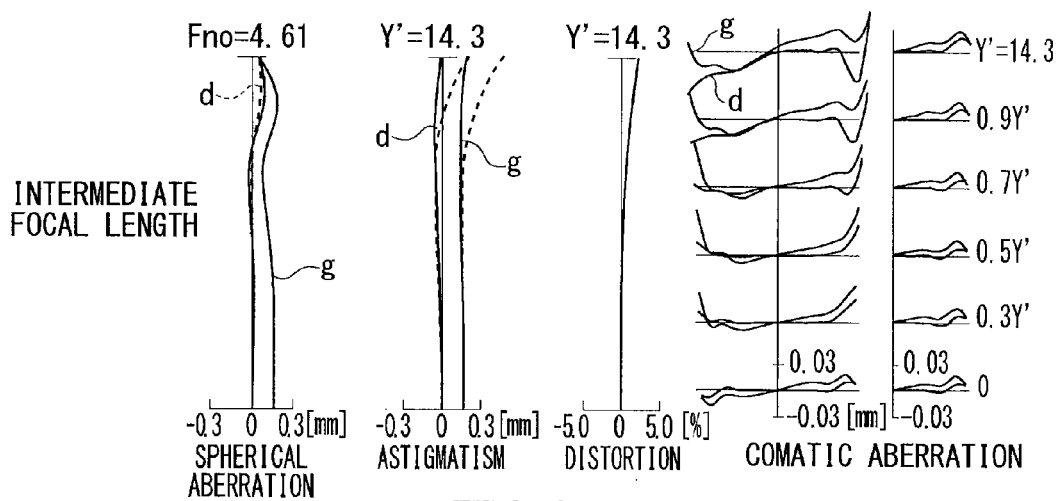
FIG. 27 shows the aberration curves of the zoom lens at intermediate focal length according to the seventh embodiment.
Figure 28:
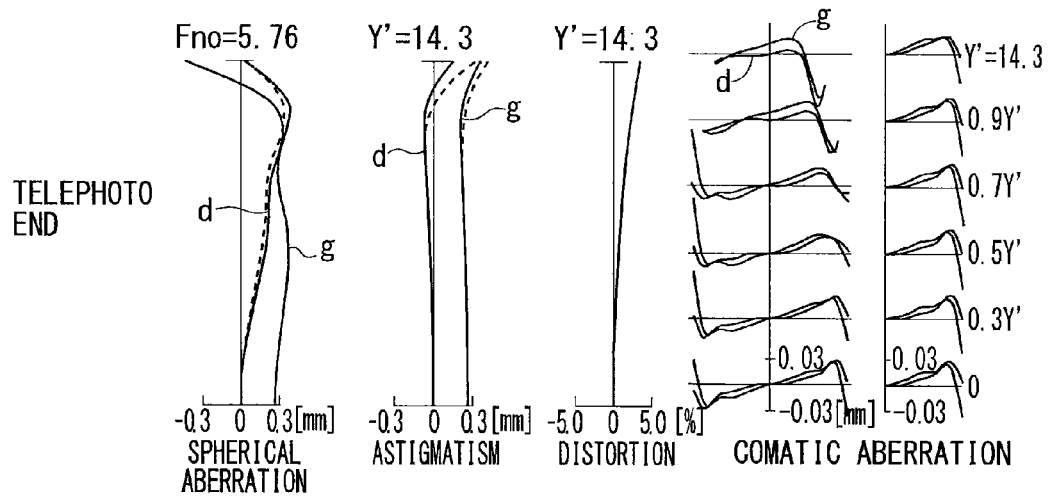
FIG. 28 shows the aberration curves of the zoom lens at telephoto end according to the seventh embodiment.

FIGS. 26 to 28 show the aberration curves of the zoom lens 10 according to the seventh embodiment at wide angle end, intermediate focal length, and telephoto end, respectively.

Eighth Embodiment

Figure 29:
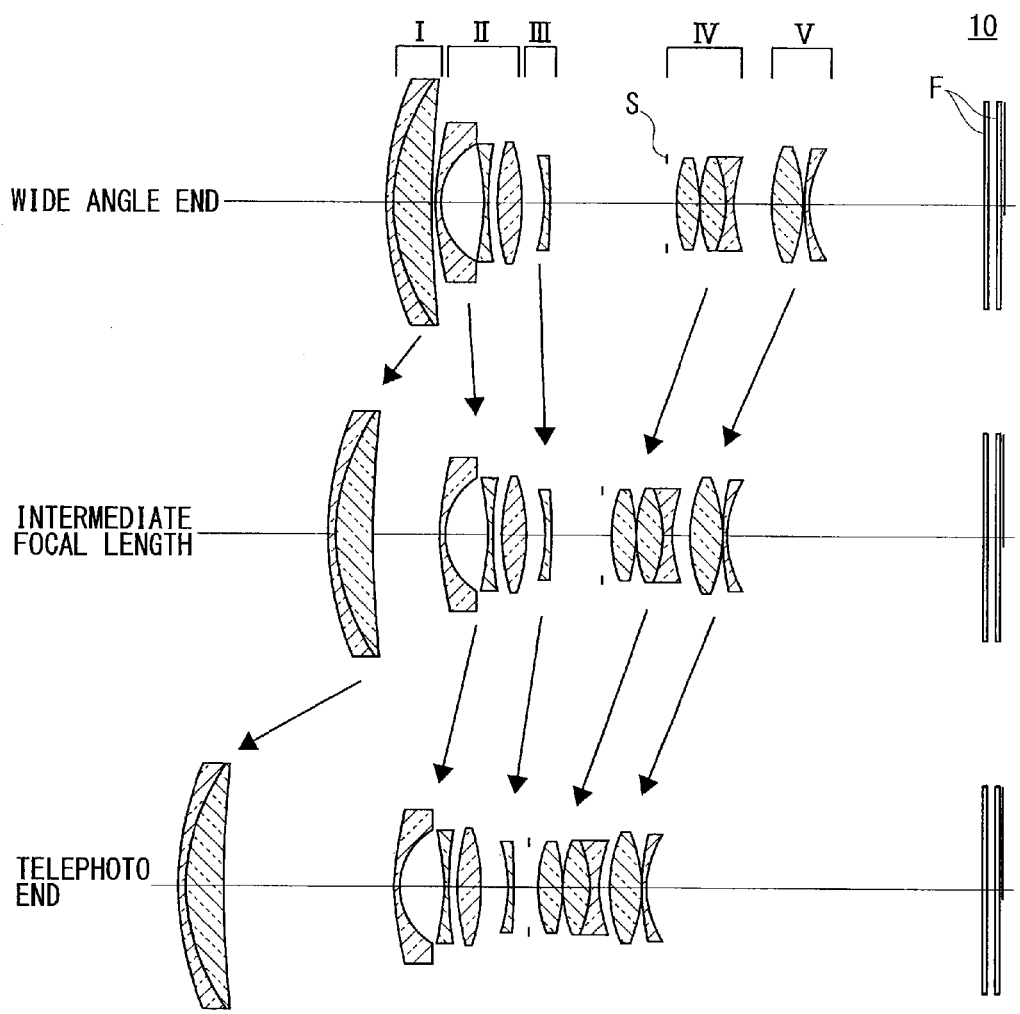
FIG. 29 shows the configuration of a zoom lens according to an eighth embodiment.

The following table 15 shows specific data on the zoom lens 10 in FIG. 29 with f=16.146 to 53.86, F=3.64 to 5.75, and ω=41.53 to 14.87.

TABLE 15

| Face No. | R | D | Nd | vd |
|---|---|---|---|---|
| 1 | 51.57017 | 1.35033 | 1.84666 | 23.78 |
| 2 | 35.08789 | 5.69112 | 1.7725 | 49.6 |
| 3 | 182.91872 | variable A | | |
| 4 | 44.57654 | 0.98972 | 2.001 | 29.13 |
| 5 | 10.55643 | 6.75921 | | |
| 6 | −44.69477 | 0.80002 | 1.7432 | 49.29 |
| 7 | 47.5051 | 1.35366 | | |
| 8 | 32.75877 | 3.82977 | 1.84666 | 23.78 |
| 9 | −32.75877 | variable B | | |
| 10 | −24.76086 | 0.8 | 1.6516 | 58.55 (S-LAL7) |
| 11 | −153.4119 | variable C | | |
| 12 | ∞ | 1.40078 | | |
| 13 | 18.96748 | 3.75245 | 1.51633 | 64.06 |
| 14 | −24.25341 | 0.09999 | | |
| 15 | 18.77954 | 4.04255 | 1.51742 | 52.43 |
| 16 | −18.77954 | 1.3999 | 1.834 | 37.16 |
| 17 | 18.77954 | variable D | | |
| 18 | 22.71409 | 5.00033 | 1.58913 | 61.15 |
| 19 | −20.0266 | 0.10002 | | |
| 20 | 56.47649 | 0.79994 | 1.90366 | 31.32 |
| 21 | 17.45296 | variable E | | |
| 22 | ∞ | 0.70000 | 1.53770 | 66.60 |
| 23 | ∞ | 1.50000 | | |
| 24 | ∞ | 0.70000 | 1.50000 | 64.00 |
| 25 | ∞ | | | |

Specific data on the aspheric surfaces of the zoom lens 10 according to the eighth embodiment are as follows.
6th Surface
K=0.000000E+00
A4=2.855640E-05
A6=−1.210950E-06
A8=1.113490E-08
A10=−5.459440E-11
7th Surface
K=0.000000E+00
A4=1.969800E-06
A6=−1.114090E-06
A8=8.666190E-09
A10=−3.951870E-11
13th Surface
K=0.000000E+00
A4=−4.439230E-06
A6=−9.177670E-08
A8=4.021770E-09
A10=−1.681980E-10
14th Surface
K=0.000000E+00
A4=2.834640E-05
A6=−2.280050E-07
A8=6.993710E-09
A10=−2.005280E-10
18th Surface
K=−4.551530E-01
A4=−2.952530E-05
A6=2.344050E-08
A8=−4.179360E-09
A10=2.547520E-12
19th Surface
K=−6.679000E-01
A4=2.331810E-05
A6=4.120810E-08
A8=−4.205110E-09

In the eighth embodiment the third lens group III is made of a glass material, S-LAL7 with vd=58.55 and θg, F=0.5425, manufactured by Ohara Inc.

The following table 16 shows variable amounts among the lenses in question in the table 15.

TABLE 16

| | Focal length | | |
|---|---|---|---|
| | 16.15 | 29.48 | 53.86 |
| Variable A | 0.50072 | 10.08202 | 26.42607 |
| Variable B | 3.48321 | 3.6098 | 4.17288 |
| Variable C | 17.98655 | 7.89556 | 2.50075 |
| Variable D | 5.94076 | 2.88738 | 1.65198 |
| Variable E | 26.7382 | 39.32604 | 51.63369 |

Figure 30:
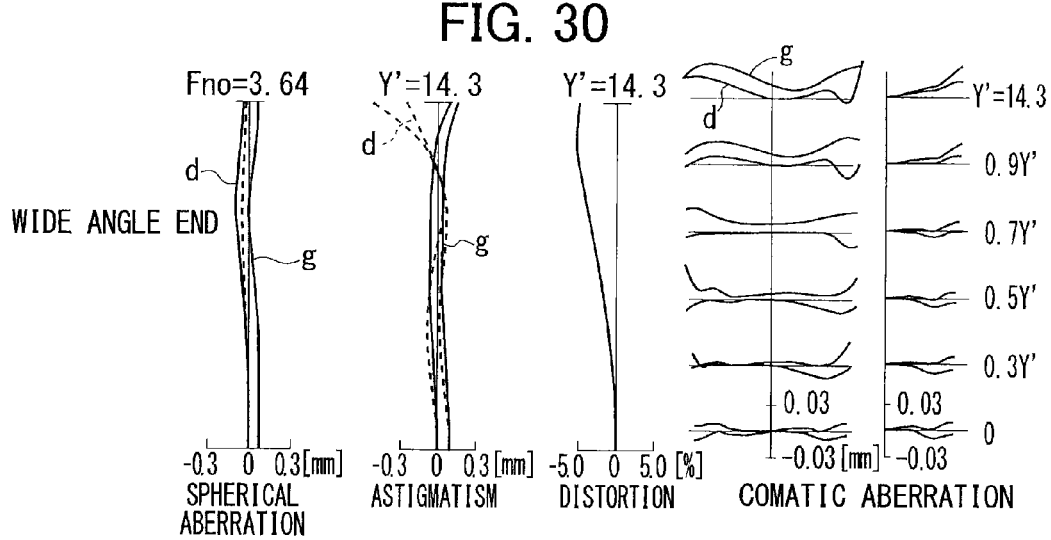
FIG. 30 shows the aberration curves of the zoom lens at wide angle end according to the eighth embodiment.
Figure 31:
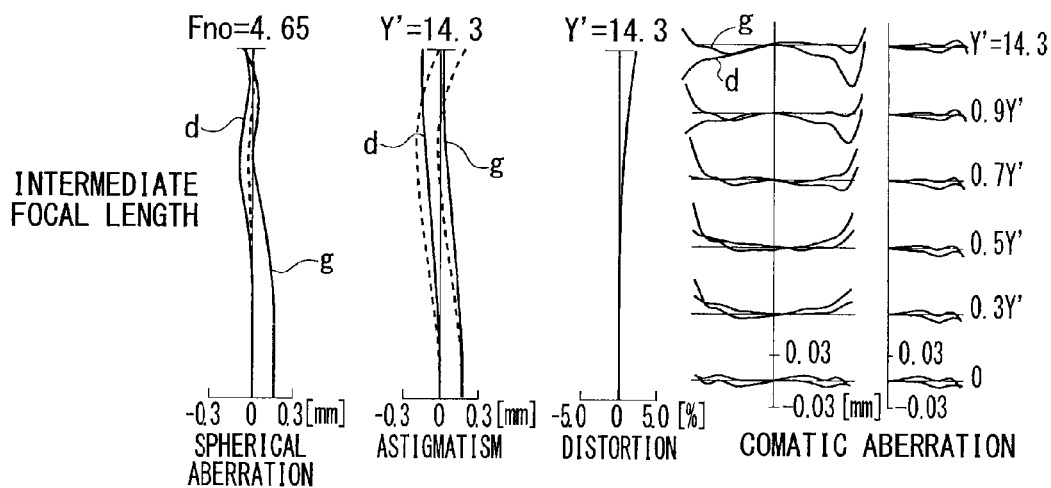
FIG. 31 shows the aberration curves of the zoom lens at intermediate focal length according to the eighth embodiment.
Figure 32:
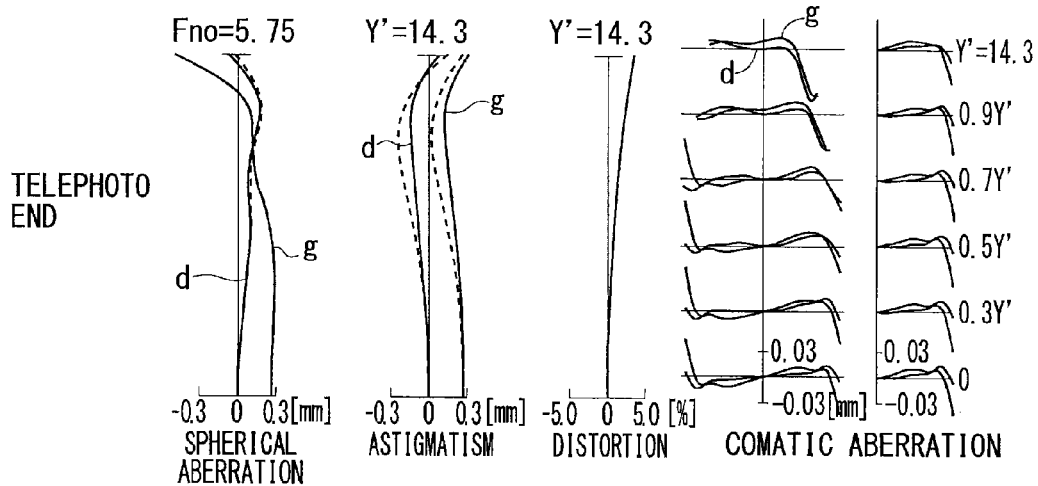
FIG. 32 shows the aberration curves of the zoom lens at telephoto end according to the eighth embodiment.

FIGS. 30 to 32 show the aberration curves of the zoom lens 10 according to the eighth embodiment at wide angle end, intermediate focal length, and telephoto end, respectively.

The following table 16 shows the parameters of the first to eleventh conditions in the first to eighth embodiments.

TABLE 17

| | $1^{st}$ | $2^{nd}$ | $3^{rd}$ | $4^{th}$ | $5^{th}$ | $6^{th}$ | $7^{th}$ | $8^{th}$ |
|---|---|---|---|---|---|---|---|---|
| $1^{st}$ Condition | −0.0403 | −0.0378 | −0.0355 | −0.0351 | −0.0364 | −0.0366 | −0.0372 | −0.0369 |
| $2^{nd}$ Condition | 1.27 | 1.32 | 1.32 | 1.02 | 1.25 | 1.24 | 1.22 | 1.14 |
| $3^{rd}$ Condition | 1.24 | 1.33 | 1.30 | 1.18 | 1.43 | 1.44 | 1.46 | 1.56 |
| $4^{th}$ Condition | 0.497 | 0.434 | 0.354 | 0.158 | 0.327 | 0.327 | 0.330 | 0.315 |
| $5^{th}$ Condition | 65.44 | 65.44 | 53.02 | 61.14 | 53.02 | 53.02 | 58.55 | 58.55 |
| $6^{th}$ Condition | 0.886 | 0.886 | 0.886 | 0.886 | 0.886 | 0.886 | 0.886 | 0.886 |
| $7^{th}$ Condition | 3.34 | 3.34 | 3.34 | 3.34 | 3.33 | 3.34 | 3.34 | 3.34 |

As obvious from the table, the zoom lenses 10 according to the first to eighth embodiments satisfy the first to eleventh conditions and achieve a half angle of view of 41 degrees or more at wide angle end and a large zoom ratio of 3.34.

Although the present invention has been described in terms of exemplary embodiments, it is not limited thereto. It should be appreciated that fluctuations may be made in the embodiments described by persons skilled in the art without departing from the scope of the present invention as defined by the following claims.

What is claimed is:

1. A zoom lens comprising:
a first lens group having a positive refractive power;
a second lens group having a negative refractive power;
a third lens group having a negative refractive power and comprised of a single negative meniscus lens with a concave surface on an object side, to move along an optical axis for focusing;
a fourth lens group having a positive refractive power;
a fifth lens group having a positive refractive power, the first to fifth groups being arranged along the optical axis in order from an object side; and
an aperture stop disposed between the third lens group and the fourth lens group, wherein:
when zooming from a wide angle end to a telephoto end, the zoom lens is moved so that an interval between the first and second lens groups increases, an interval between the second and third lens groups increases, an interval between the third and fourth lens groups decreases, and an interval between the fourth and fifth lens groups decreases; and
the fourth and fifth lens groups are set to have a combined lateral magnification to satisfy the following condition, when an object distance is infinite at a telephoto end:

$$-0.041 < \beta_{45T}/Ft < -0.025$$

where Ft is a focal length of the entire zoom lens at the telephoto end and $\beta_{45T}$ is combined lateral magnification of the fourth and fifth lens groups.

2. A zoom lens according to claim 1, wherein
the fourth and fifth lens groups are set to have focal lengths to satisfy the following conditions:

$$1.0 < F4/Fm < 1.5$$

$$1.1 < F5/Fm < 1.8$$

where F4 is the focal length of the fourth lens group, F5 is the focal length of the fifth lens group, and Fm is a geometric mean of Ft obtained by $\sqrt{(Fw \ast Ft)}$ where Fw is a focal length at the wide angle end and Ft is a focal length at the telephoto end.

3. A zoom lens according to claim 1, wherein
the third lens group is set to have a combined lateral magnification satisfying the following condition, when an object distance is infinite at the telephoto end:

$$0.1 < \beta_{3T} < 0.6$$

where $\beta_{3T}$ is a combined lateral magnification.

4. A zoom lens according to claim 1, wherein
the negative meniscus lens of the third lens group is made from a material with an abbe number which satisfies the following condition:

$$vd > 50$$

where vd is the abbe number.

5. A zoom lens according to claim 1, wherein
the zoom lens is configured to satisfy the following conditions:

$$0.75 < Y'/Fw$$

$$2.8 < Ft/Fw$$

where Y' is a maximal image height, Ft is a focal length at the telephoto end, and Fw is a focal length at the wide angle end.

6. An information device with a photographic function, comprising the zoom lens according to claim 1 as an optical system.

7. An information device with a photographic function according to claim 6, further comprising
an image sensor of which an image of a subject captured by the zoom lens is formed on a light receiving surface.

8. An information device with a photographic function according to claim 7, wherein
the information device is a hand-held data terminal device.

9. A zoom lens comprising:
a first lens group having a positive refractive power;
a second lens group having a negative refractive power;
a third lens group having a negative refractive power and comprised of a single negative meniscus lens with a concave surface on an object side, to move along an optical axis for focusing;
a fourth lens group having a positive refractive power;
a fifth lens group having a positive refractive power, the first to fifth groups being arranged along the optical axis in order from an object side; and
an aperture stop disposed between the third lens group and the fourth lens group, wherein:
when zooming from a wide angle end to a telephoto end, the zoom lens is moved so that an interval between the first and second lens groups increases, an interval between the second and third lens groups increases, an interval between the third and fourth lens groups decreases, and an interval between the fourth and fifth lens groups decreases; and
the fourth and fifth lens groups are set to have a combined lateral magnification to satisfy the following conditions, when an object distance is infinite at a telephoto end or at a wide angle end:

$$2.0 < \beta_{45T}/\beta_{45W} < 2.5$$

$$-1.1 < \beta_{45W} < -0.7$$

$$-2.4 < \beta_{45T} < -1.8$$

where $\beta_{45W}$ is a combined lateral magnification at the wide angle end and $\beta_{45T}$ is a combined lateral magnification at the telephoto end.

10. A zoom lens according to claim 9, wherein
the fourth and fifth lens groups are set to have focal lengths to satisfy the following conditions:

$$1.0 < F4/Fm < 1.5$$

$$1.1 < F5/Fm < 1.8$$

where F4 is the focal length of the fourth lens group, F5 is the focal length of the fifth lens group, and Fm is a geometric mean of Ft obtained by $\sqrt{(Fw \ast Ft)}$ where Fw is a focal length at the wide angle end and Ft is a focal length at the telephoto end.

11. A zoom lens according to claim 9, wherein
the third lens group is set to have a lateral magnification satisfying the following condition, when an object distance is infinite at the wide angle end or at the telephoto end:

$$0.7 < \beta_{3T}/\beta_{3w} < 0.98$$

where $\beta_{3T}$ is a lateral magnification at the telephoto end and $\beta_{3w}$ is a lateral magnification at the wide angle end.

12. A zoom lens according to claim 9, wherein
the negative meniscus lens of the third lens group is made from a material with an abbe number which satisfies the following condition:

$$vd > 50$$

where vd is the abbe number.

13. A zoom lens according to claim 9, wherein
the zoom lens is configured to satisfy the following conditions:

$$0.75 < Y'/Fw$$

$$2.8 < Ft/Fw$$

where Y' is a maximal image height, Ft is a focal length at the telephoto end, and F2 is a focal length at the wide angle end.

14. An information device with a photographic function, comprising the zoom lens according to claim 9 as an optical system.

15. An information device with a photographic function according to claim 14, further comprising
an image sensor of which an image of a subject captured by the zoom lens is formed on a light receiving surface.

16. An information device with a photographic function according to claim 15, wherein
the information device is a hand-held data terminal device.

* * * * *